US008330582B2

(12) United States Patent
Harris et al.

(10) Patent No.: US 8,330,582 B2
(45) Date of Patent: Dec. 11, 2012

(54) ONLINE REMOTE CONTROL CONFIGURATION SYSTEM

(75) Inventors: Glen McLean Harris, Mississauga (CA); Justin M. Henry, Mississauga (CA)

(73) Assignee: Logitech Europe S.A., Morges (CH)

( * ) Notice: Subject to any disclaimer, the term of this patent is extended or adjusted under 35 U.S.C. 154(b) by 0 days.

(21) Appl. No.: 11/841,764

(22) Filed: Aug. 20, 2007

(65) Prior Publication Data

US 2008/0062034 A1 Mar. 13, 2008

Related U.S. Application Data

(63) Continuation of application No. 10/839,970, filed on May 5, 2004, now Pat. No. 7,612,685, which is a continuation of application No. 09/804,623, filed on Mar. 12, 2001, now abandoned.

(60) Provisional application No. 60/189,487, filed on Mar. 15, 2000.

(51) Int. Cl.
*G05B 11/01* (2006.01)

(52) U.S. Cl. .................................... 340/12.22; 340/4.61

(58) Field of Classification Search ............... 340/825.2, 340/825.22, 825.69, 825.72, 12.22, 5.61, 340/426.13, 4.61; 341/176
See application file for complete search history.

(56) References Cited

U.S. PATENT DOCUMENTS

| | | | |
|---|---|---|---|
| 3,597,531 | A | 8/1971 | De Marinis et al. |
| 3,990,012 | A | 11/1976 | Karnes |
| 4,174,517 | A | 11/1979 | Mandel |
| 4,231,031 | A | 10/1980 | Crowther et al. |
| 4,287,676 | A | 9/1981 | Weinhaus |
| 4,377,870 | A | 3/1983 | Anderson et al. |
| 4,392,022 | A | 7/1983 | Carlson |
| 4,394,691 | A | 7/1983 | Amano et al. |
| 4,475,123 | A | 10/1984 | Dumbauld et al. |
| 4,488,179 | A | 12/1984 | Kruger et al. |
| 4,566,034 | A | 1/1986 | Harger et al. |
| 4,567,512 | A | 1/1986 | Abraham |
| 4,592,546 | A | 6/1986 | Fascenda et al. |
| 4,623,887 | A | 11/1986 | Welles, II |
| 4,626,848 | A | 12/1986 | Ehlers |
| 4,703,359 | A | 10/1987 | Rumboldt et al. |

(Continued)

FOREIGN PATENT DOCUMENTS

AU 66267/90 4/1992

(Continued)

OTHER PUBLICATIONS

U.S. Appl. No. 12/245,675, filed Oct. 3, 2008, Harris et al.

(Continued)

*Primary Examiner* — Vernal Brown
(74) *Attorney, Agent, or Firm* — Kilpatrick Townsend & Stockton LLP

(57) ABSTRACT

A remote control is configured to control a multimedia appliance and to be communicatively coupled to a remote server via a network. The remote server is configured to provides information to the remote control via the network. The remote control includes a transmitter configured to send commands to the multimedia appliance. The remote control further includes a memory configured to store information provided by the remote server. The remote control further includes a controller configured to synchronize information with the remote server to obtain current information on an irregular basis from the remote server to thereby obtain information that degrades partially over time.

25 Claims, 16 Drawing Sheets

U.S. PATENT DOCUMENTS

| | | | |
|---|---|---|---|
| 4,706,121 | A | 11/1987 | Young |
| 4,712,105 | A | 12/1987 | Kohler |
| 4,728,949 | A | 3/1988 | Platte et al. |
| 4,746,919 | A | 5/1988 | Reitmeier |
| 4,774,511 | A | 9/1988 | Rumbolt et al. |
| 4,792,972 | A | 12/1988 | Cook, Jr. |
| 4,807,031 | A | 2/1989 | Broughton et al. |
| 4,825,200 | A | 4/1989 | Evans et al. |
| 4,825,209 | A | 4/1989 | Sasaki et al. |
| 4,837,627 | A | 6/1989 | Mengel |
| 4,845,491 | A | 7/1989 | Fascenda et al. |
| 4,857,898 | A | 8/1989 | Smith |
| 4,866,434 | A | 9/1989 | Keenan |
| 4,876,592 | A | 10/1989 | Von Kohorn |
| 4,888,709 | A | 12/1989 | Revesz et al. |
| 4,899,370 | A | 2/1990 | Kameo et al. |
| 4,918,439 | A | 4/1990 | Wozniak et al. |
| 4,941,090 | A | 7/1990 | McCarthy |
| 4,959,719 | A | 9/1990 | Strubbe et al. |
| 4,959,810 | A | 9/1990 | Darbee et al. |
| RE33,369 | E | 10/1990 | Hashimoto |
| 4,962,466 | A | 10/1990 | Revesz et al. |
| 4,989,081 | A | 1/1991 | Miyagawa et al. |
| 4,999,622 | A | 3/1991 | Amano et al. |
| 5,001,554 | A | 3/1991 | Johnson et al. |
| 5,016,272 | A | 5/1991 | Stubbs et al. |
| 5,033,079 | A | 7/1991 | Catron et al. |
| 5,046,093 | A | 9/1991 | Wachob |
| 5,065,235 | A | 11/1991 | Iijima |
| 5,065,251 | A | 11/1991 | Shuhart, Jr. et al. |
| 5,097,249 | A | 3/1992 | Yamamoto |
| 5,109,222 | A | 4/1992 | Welty |
| 5,115,236 | A | 5/1992 | Kohler |
| 5,128,752 | A | 7/1992 | Von Kohorn |
| 5,132,679 | A | 7/1992 | Kubo et al. |
| 5,140,326 | A | 8/1992 | Bacrania et al. |
| 5,151,789 | A | 9/1992 | Young |
| 5,161,023 | A | 11/1992 | Keenan |
| 5,177,461 | A | 1/1993 | Budzyna |
| 5,202,826 | A | 4/1993 | McCarthy |
| 5,204,768 | A | 4/1993 | Tsakiris et al. |
| 5,206,722 | A | 4/1993 | Kwan |
| 5,220,420 | A | 6/1993 | Hoarty et al. |
| 5,228,077 | A | 7/1993 | Darbee |
| 5,237,327 | A | 8/1993 | Saitoh et al. |
| 5,249,044 | A | 9/1993 | Von Kohorn |
| 5,251,048 | A | 10/1993 | Doane et al. |
| 5,255,313 | A | 10/1993 | Darbee |
| 5,272,418 | A | 12/1993 | Howe et al. |
| 5,282,028 | A | 1/1994 | Johnson et al. |
| 5,285,278 | A | 2/1994 | Holman |
| 5,287,181 | A | 2/1994 | Holman |
| 5,287,268 | A | 2/1994 | McCarthy |
| 5,297,204 | A | 3/1994 | Levine |
| 5,341,166 | A | 8/1994 | Garr et al. |
| 5,353,121 | A | 10/1994 | Young et al. |
| 5,355,480 | A | 10/1994 | Smith et al. |
| 5,367,316 | A | 11/1994 | Ikezaki |
| 5,374,999 | A | 12/1994 | Chuang et al. |
| 5,381,991 | A | 1/1995 | Stocker |
| 5,382,947 | A | 1/1995 | Thaler et al. |
| 5,404,393 | A | 4/1995 | Remillard |
| 5,406,558 | A | 4/1995 | Rovira et al. |
| 5,410,326 | A | 4/1995 | Goldstein |
| 5,414,426 | A | 5/1995 | O'Donnell et al. |
| 5,414,761 | A | 5/1995 | Darbee |
| 5,416,535 | A | 5/1995 | Sato et al. |
| 5,418,424 | A | 5/1995 | Aprile et al. |
| 5,422,783 | A | 6/1995 | Darbee |
| 5,446,551 | A | 8/1995 | Kawaguchi et al. |
| 5,455,570 | A | 10/1995 | Cook et al. |
| 5,461,667 | A | 10/1995 | Remillard |
| 5,479,266 | A | 12/1995 | Young et al. |
| 5,479,268 | A | 12/1995 | Young et al. |
| 5,481,251 | A | 1/1996 | Buys et al. |
| 5,481,256 | A | 1/1996 | Darbee et al. |
| 5,483,276 | A | 1/1996 | Brooks et al. |
| 5,497,185 | A | 3/1996 | Dufresne et al. |
| 5,500,681 | A | 3/1996 | Jones |
| 5,500,794 | A | 3/1996 | Fujita et al. |
| 5,502,504 | A | 3/1996 | Marshall et al. |
| 5,504,475 | A | 4/1996 | Houdou et al. |
| 5,515,052 | A | 5/1996 | Darbee |
| 5,515,106 | A | 5/1996 | Darbee |
| 5,515,270 | A | 5/1996 | Monta et al. |
| 5,523,794 | A | 6/1996 | Marshall et al. |
| 5,523,796 | A | 6/1996 | Marshall et al. |
| 5,524,141 | A | 6/1996 | Braun et al. |
| 5,524,195 | A | 6/1996 | Clanton, III et al. |
| 5,528,304 | A | 6/1996 | Cherrick et al. |
| 5,532,689 | A | 7/1996 | Bueno |
| 5,532,732 | A | 7/1996 | Yuen et al. |
| 5,532,754 | A | 7/1996 | Young et al. |
| 5,537,106 | A | 7/1996 | Mitsuhashi |
| 5,537,107 | A | 7/1996 | Funado |
| 5,537,463 | A | 7/1996 | Escobosa et al. |
| 5,539,393 | A | 7/1996 | Barfod |
| 5,550,576 | A | 9/1996 | Darbee et al. |
| 5,552,837 | A | 9/1996 | Mankovitz |
| 5,552,917 | A | 9/1996 | Darbee et al. |
| 5,557,338 | A | 9/1996 | Maze et al. |
| 5,557,721 | A | 9/1996 | Fite et al. |
| 5,559,548 | A | 9/1996 | Davis et al. |
| 5,566,353 | A | 10/1996 | Cho et al. |
| 5,568,367 | A | 10/1996 | Park |
| 5,576,755 | A | 11/1996 | Davis et al. |
| 5,576,768 | A | 11/1996 | Gomikawa |
| 5,579,055 | A | 11/1996 | Hamilton et al. |
| 5,579,221 | A | 11/1996 | Mun |
| 5,583,491 | A | 12/1996 | Kim |
| 5,585,838 | A | 12/1996 | Lawler et al. |
| 5,585,866 | A | 12/1996 | Miller et al. |
| 5,589,892 | A | 12/1996 | Knee et al. |
| 5,592,551 | A | 1/1997 | Lett et al. |
| 5,596,373 | A | 1/1997 | White et al. |
| 5,600,573 | A | 2/1997 | Hendricks et al. |
| 5,603,078 | A | 2/1997 | Henderson et al. |
| 5,604,923 | A | 2/1997 | Wilkus |
| 5,614,906 | A | 3/1997 | Hayes et al. |
| 5,619,196 | A | 4/1997 | Escobosa |
| 5,619,251 | A | 4/1997 | Kuroiwa et al. |
| 5,625,608 | A | 4/1997 | Grewe et al. |
| 5,627,567 | A | 5/1997 | Davidson |
| 5,629,733 | A | 5/1997 | Youman et al. |
| 5,629,868 | A | 5/1997 | Tessier et al. |
| 5,638,050 | A | 6/1997 | Sacca et al. |
| 5,638,113 | A | 6/1997 | Lappington et al. |
| 5,646,608 | A | 7/1997 | Shintani |
| 5,650,831 | A | 7/1997 | Farwell |
| 5,663,757 | A | 9/1997 | Morales |
| 5,671,267 | A | 9/1997 | August et al. |
| 5,677,711 | A | 10/1997 | Kuo |
| 5,684,526 | A | 11/1997 | Yoshinobu |
| 5,686,891 | A | 11/1997 | Sacca et al. |
| 5,689,353 | A | 11/1997 | Darbee et al. |
| 5,695,400 | A | 12/1997 | Fennell, Jr. et al. |
| 5,710,601 | A | 1/1998 | Marshall et al. |
| 5,710,605 | A | 1/1998 | Nelson |
| 5,734,838 | A | 3/1998 | Robinson et al. |
| 5,761,601 | A | 6/1998 | Nemirofsky et al. |
| 5,768,680 | A | 6/1998 | Thomas |
| 5,774,172 | A | 6/1998 | Kapell et al. |
| 5,778,256 | A | 7/1998 | Darbee |
| 5,781,894 | A | 7/1998 | Petrecca et al. |
| 5,786,814 | A | 7/1998 | Moran et al. |
| 5,794,210 | A | 8/1998 | Goldhaber et al. |
| 5,796,832 | A | 8/1998 | Kawan |
| 5,800,268 | A | 9/1998 | Molnick |
| 5,806,065 | A | 9/1998 | Lomet |
| 5,815,086 | A | 9/1998 | Ivie et al. |
| 5,819,034 | A | 10/1998 | Joseph et al. |
| 5,819,294 | A | 10/1998 | Chambers |
| 5,822,123 | A | 10/1998 | Davis et al. |
| 5,828,318 | A | 10/1998 | Cesar et al. |
| 5,828,945 | A | 10/1998 | Klosterman |
| 5,850,249 | A | 12/1998 | Massetti et al. |
| 5,855,008 | A | 12/1998 | Goldhaber et al. |

5,870,030 A 2/1999 DeLuca et al.
5,870,683 A 2/1999 Wells
RE36,119 E 3/1999 Kunishima
5,883,680 A 3/1999 Nykerk
5,886,691 A 3/1999 Furuya et al.
5,907,322 A 5/1999 Kelly et al.
5,909,183 A 6/1999 Borgstahl et al.
5,923,016 A 7/1999 Fredregill et al.
5,940,073 A 8/1999 Klosterman et al.
5,943,228 A 8/1999 Kim
5,946,646 A 8/1999 Schena et al.
5,949,351 A 9/1999 Hahm
5,953,144 A 9/1999 Darbee et al.
5,959,751 A 9/1999 Darbee et al.
5,963,145 A 10/1999 Escobosa
6,002,443 A 12/1999 Iggulden
6,002,450 A 12/1999 Darbee et al.
6,008,802 A 12/1999 Iki et al.
6,014,092 A 1/2000 Darbee et al.
6,040,829 A 3/2000 Croy et al.
6,057,872 A 5/2000 Candelore
6,073,374 A 6/2000 Tingmo
6,097,309 A 8/2000 Hayes et al.
6,097,441 A 8/2000 Allport
6,097,520 A 8/2000 Kadnier
6,104,334 A * 8/2000 Allport ......................... 341/175
6,127,941 A 10/2000 Van Ryzin et al.
6,130,625 A 10/2000 Harvey
6,130,726 A * 10/2000 Darbee et al. ................ 348/734
6,133,847 A 10/2000 Yang
6,144,315 A 11/2000 Flick
6,144,375 A 11/2000 Jain et al.
6,147,677 A 11/2000 Escobosa et al.
6,154,204 A 11/2000 Thompson et al.
6,157,319 A 12/2000 Johns et al.
6,169,451 B1 1/2001 Kim
6,173,330 B1 1/2001 Guo et al.
6,177,931 B1 1/2001 Alexander et al.
6,195,033 B1 2/2001 Darbee et al.
6,198,481 B1 3/2001 Urano et al.
6,208,341 B1 3/2001 van Ee et al.
6,211,870 B1 4/2001 Foster
6,223,348 B1 4/2001 Hayes et al.
6,225,938 B1 5/2001 Hayes et al.
6,243,035 B1 6/2001 Walter et al.
6,255,961 B1 * 7/2001 Van Ryzin et al. ...... 340/825.25
6,271,831 B1 8/2001 Escobosa et al.
6,275,268 B1 8/2001 Ellis et al.
6,278,499 B1 8/2001 Darbee
6,288,799 B1 9/2001 Sekiguchi
6,326,947 B1 12/2001 Capps et al.
6,330,091 B1 12/2001 Escobosa et al.
6,369,803 B2 4/2002 Brisebois et al.
6,374,404 B1 4/2002 Brotz et al.
6,397,187 B1 5/2002 Gindlesperger
6,408,435 B1 6/2002 Sato
6,445,306 B1 9/2002 Trovato et al.
6,469,633 B1 10/2002 Wachter
6,483,548 B1 11/2002 Allport
6,483,906 B1 11/2002 Iggulden et al.
6,496,135 B1 12/2002 Darbee
6,504,580 B1 1/2003 Thompson
6,522,262 B1 2/2003 Hayes et al.
6,532,592 B1 3/2003 Shintani et al.
6,538,556 B1 3/2003 Kawajiri
6,563,430 B1 5/2003 Kemink et al.
6,567,011 B1 5/2003 Young et al.
6,567,984 B1 5/2003 Allport
6,587,067 B2 7/2003 Darbee et al.
6,628,340 B1 9/2003 Graczyk et al.
6,629,077 B1 9/2003 Arling et al.
6,640,144 B1 10/2003 Huang et al.
6,642,852 B2 11/2003 Dresti et al.
6,650,247 B1 11/2003 Hayes
6,657,679 B2 12/2003 Hayes et al.
6,690,290 B2 2/2004 Young et al.
6,690,392 B1 2/2004 Wugoski
6,701,091 B2 3/2004 Escobosa et al.
6,720,904 B1 4/2004 Darbee
6,722,984 B1 4/2004 Sweeney, Jr. et al.
6,724,339 B2 4/2004 Conway et al.
6,747,591 B1 6/2004 Lilleness et al.
6,748,248 B1 6/2004 Pan et al.
6,748,462 B2 6/2004 Dubil et al.
6,759,967 B1 7/2004 Staller
6,781,518 B1 8/2004 Hayes et al.
6,781,638 B1 8/2004 Hayes
6,784,804 B1 8/2004 Hayes et al.
6,784,805 B2 8/2004 Harris et al.
6,785,579 B2 8/2004 Huang et al.
6,788,241 B2 9/2004 Arling et al.
6,813,619 B2 11/2004 Devara
6,826,370 B2 11/2004 Escobosa et al.
6,829,512 B2 12/2004 Huang et al.
6,829,992 B2 12/2004 Kobayashi et al.
6,842,653 B2 1/2005 Weishut et al.
6,847,101 B2 1/2005 Fjelstad et al.
6,859,197 B2 2/2005 Klein et al.
6,862,741 B1 * 3/2005 Grooters ......................... 725/39
6,870,463 B2 3/2005 Dresti et al.
6,874,037 B1 * 3/2005 Abram et al. ................. 709/248
6,882,299 B1 4/2005 Allport
6,882,729 B2 4/2005 Arling et al.
6,885,952 B1 4/2005 Hayes et al.
6,917,302 B2 7/2005 Lilleness et al.
6,933,833 B1 8/2005 Darbee
6,938,101 B2 8/2005 Hayes et al.
6,946,988 B2 9/2005 Edwards et al.
6,947,101 B2 9/2005 Arling
6,968,570 B2 11/2005 Hayes et al.
6,980,150 B2 12/2005 Conway et al.
7,005,979 B2 2/2006 Haughawout et al.
7,009,528 B2 3/2006 Griep
7,010,805 B2 3/2006 Hayes et al.
7,013,434 B2 3/2006 Masters et al.
RE39,059 E 4/2006 Foster
7,046,161 B2 5/2006 Hayes
7,079,113 B1 7/2006 Hayes et al.
7,091,898 B2 8/2006 Arling et al.
7,093,003 B2 8/2006 Yuh et al.
7,102,688 B2 9/2006 Hayes et al.
7,119,710 B2 10/2006 Hayes et al.
7,126,468 B2 10/2006 Arling et al.
7,129,995 B2 10/2006 Arling
7,135,985 B2 11/2006 Woolgar et al.
7,136,709 B2 11/2006 Arling et al.
7,142,127 B2 11/2006 Hayes et al.
7,142,934 B2 11/2006 Janik
7,142,935 B2 11/2006 Janik
7,143,214 B2 11/2006 Hayes et al.
7,151,528 B2 12/2006 Taylor et al.
7,154,428 B2 12/2006 Clercq et al.
7,155,305 B2 12/2006 Hayes et al.
7,161,524 B2 1/2007 Nguyen
7,167,765 B2 1/2007 Janik
7,167,913 B2 1/2007 Chanmbers
7,193,661 B2 3/2007 Dresti et al.
7,200,357 B2 4/2007 Janik et al.
7,209,116 B2 4/2007 Gates et al.
7,218,243 B2 5/2007 Hayes et al.
7,221,306 B2 5/2007 Young
7,224,903 B2 5/2007 Colmenarez et al.
RE39,716 E 7/2007 Huang et al.
7,253,765 B2 8/2007 Edwards et al.
7,254,777 B2 8/2007 Hayes et al.
7,266,701 B2 9/2007 Hayes et al.
7,266,777 B2 9/2007 Scott et al.
7,268,694 B2 9/2007 Hayes et al.
7,274,303 B2 9/2007 Dresti et al.
7,281,262 B2 10/2007 Hayes et al.
7,283,059 B2 10/2007 Harris et al.
7,319,409 B2 1/2008 Hayes et al.
7,319,426 B2 1/2008 Garfio
7,436,319 B1 10/2008 Harris et al.
7,574,693 B1 8/2009 Kemink
7,612,685 B2 11/2009 Harris et al.
7,746,244 B2 6/2010 Wouters
7,889,095 B1 2/2011 Harris et al.

| | | | | |
|---|---|---|---|---|
| 7,944,370 | B1 | 5/2011 | Harris et al. | |
| 8,026,789 | B2 | 9/2011 | Harris et al. | |
| 2001/0033243 | A1 | 10/2001 | Harris et al. | |
| 2002/0008789 | A1 | 1/2002 | Harris et al. | |
| 2002/0046083 | A1 | 4/2002 | Ondeck | |
| 2002/0056084 | A1 | 5/2002 | Harris et al. | |
| 2002/0151327 | A1* | 10/2002 | Levitt | 455/556 |
| 2002/0184626 | A1 | 12/2002 | Darbee et al. | |
| 2002/0190956 | A1 | 12/2002 | Klein et al. | |
| 2002/0194410 | A1 | 12/2002 | Hayes et al. | |
| 2003/0046579 | A1 | 3/2003 | Hayes et al. | |
| 2003/0048295 | A1 | 3/2003 | Lilleness et al. | |
| 2003/0095156 | A1 | 5/2003 | Klein et al. | |
| 2003/0103088 | A1 | 6/2003 | Dresti et al. | |
| 2003/0117427 | A1 | 6/2003 | Haughawout et al. | |
| 2003/0151538 | A1 | 8/2003 | Escobosa et al. | |
| 2003/0164773 | A1 | 9/2003 | Young et al. | |
| 2003/0164787 | A1 | 9/2003 | Dresti et al. | |
| 2003/0189509 | A1 | 10/2003 | Hayes et al. | |
| 2003/0193519 | A1 | 10/2003 | Hayes et al. | |
| 2003/0233664 | A1 | 12/2003 | Huang et al. | |
| 2004/0046677 | A1 | 3/2004 | Dresti et al. | |
| 2004/0056789 | A1 | 3/2004 | Arling et al. | |
| 2004/0056984 | A1 | 3/2004 | Hayes et al. | |
| 2004/0070491 | A1 | 4/2004 | Huang et al. | |
| 2004/0093096 | A1 | 5/2004 | Huang et al. | |
| 2004/0117632 | A1 | 6/2004 | Arling et al. | |
| 2004/0136726 | A1 | 7/2004 | Escobosa et al. | |
| 2004/0169590 | A1 | 9/2004 | Haughawout et al. | |
| 2004/0169598 | A1 | 9/2004 | Arling et al. | |
| 2004/0189508 | A1 | 9/2004 | Nguyen | |
| 2004/0189509 | A1 | 9/2004 | Lilleness et al. | |
| 2004/0210933 | A1 | 10/2004 | Dresti et al. | |
| 2004/0246165 | A1 | 12/2004 | Conway et al. | |
| 2004/0263349 | A1 | 12/2004 | Haughawout et al. | |
| 2004/0266419 | A1 | 12/2004 | Arling et al. | |
| 2004/0268391 | A1 | 12/2004 | De Clercq et al. | |
| 2005/0024226 | A1 | 2/2005 | Hayes et al. | |
| 2005/0030196 | A1 | 2/2005 | Harris et al. | |
| 2005/0052423 | A1 | 3/2005 | Harris et al. | |
| 2005/0055716 | A1 | 3/2005 | Louie et al. | |
| 2005/0062614 | A1 | 3/2005 | Young | |
| 2005/0062636 | A1 | 3/2005 | Conway et al. | |
| 2005/0066370 | A1 | 3/2005 | Alvarado et al. | |
| 2005/0078087 | A1 | 4/2005 | Gates et al. | |
| 2005/0080496 | A1 | 4/2005 | Hayes et al. | |
| 2005/0088315 | A1 | 4/2005 | Klein et al. | |
| 2005/0094610 | A1 | 5/2005 | de Clerq et al. | |
| 2005/0096753 | A1 | 5/2005 | Arling et al. | |
| 2005/0097594 | A1 | 5/2005 | O'Donnell et al. | |
| 2005/0097618 | A1 | 5/2005 | Arling et al. | |
| 2005/0107966 | A1 | 5/2005 | Hayes | |
| 2005/0116930 | A1 | 6/2005 | Gates | |
| 2005/0134578 | A1 | 6/2005 | Chambers et al. | |
| 2005/0159823 | A1 | 7/2005 | Hayes et al. | |
| 2005/0162282 | A1 | 7/2005 | Dresti et al. | |
| 2005/0183104 | A1 | 8/2005 | Edwards et al. | |
| 2005/0195979 | A1 | 9/2005 | Arling et al. | |
| 2005/0200598 | A1 | 9/2005 | Hayes et al. | |
| 2005/0210101 | A1 | 9/2005 | Janik | |
| 2005/0216606 | A1 | 9/2005 | Hayes et al. | |
| 2005/0216843 | A1 | 9/2005 | Masters et al. | |
| 2005/0231649 | A1 | 10/2005 | Arling | |
| 2005/0258806 | A1 | 11/2005 | Janik et al. | |
| 2005/0280743 | A1 | 12/2005 | Dresti et al. | |
| 2005/0283814 | A1 | 12/2005 | Scott et al. | |
| 2005/0285750 | A1 | 12/2005 | Hayes et al. | |
| 2006/0007306 | A1 | 1/2006 | Masters et al. | |
| 2006/0012488 | A1 | 1/2006 | Hilbrink et al. | |
| 2006/0031400 | A1 | 2/2006 | Yuh et al. | |
| 2006/0031437 | A1 | 2/2006 | Chambers | |
| 2006/0031549 | A1 | 2/2006 | Janik et al. | |
| 2006/0031550 | A1 | 2/2006 | Janik et al. | |
| 2006/0050142 | A1 | 3/2006 | Scott et al. | |
| 2006/0055554 | A1 | 3/2006 | Hayes et al. | |
| 2006/0101498 | A1 | 5/2006 | Arling et al. | |
| 2006/0125800 | A1 | 6/2006 | Janik | |
| 2006/0132458 | A1 | 6/2006 | Garfio et al. | |
| 2006/0143572 | A1 | 6/2006 | Scott et al. | |
| 2006/0150120 | A1 | 7/2006 | Dresti et al. | |
| 2006/0161865 | A1 | 7/2006 | Scott et al. | |
| 2006/0192855 | A1 | 8/2006 | Harris et al. | |
| 2006/0194549 | A1 | 8/2006 | Janik et al. | |
| 2006/0200538 | A1 | 9/2006 | Yuh et al. | |
| 2006/0259183 | A1 | 11/2006 | Hayes et al. | |
| 2006/0259184 | A1 | 11/2006 | Hayes et al. | |
| 2006/0259864 | A1 | 11/2006 | Klein et al. | |
| 2006/0262002 | A1 | 11/2006 | Nguyen | |
| 2006/0283697 | A1 | 12/2006 | Garfio | |
| 2006/0288300 | A1 | 12/2006 | Chambers et al. | |
| 2006/0294217 | A1 | 12/2006 | Chambers | |
| 2007/0037522 | A1 | 2/2007 | Liu et al. | |
| 2007/0052547 | A1 | 3/2007 | Haughawout et al. | |
| 2007/0061027 | A1 | 3/2007 | Janik | |
| 2007/0061028 | A1 | 3/2007 | Janik | |
| 2007/0061029 | A1 | 3/2007 | Janik | |
| 2007/0063860 | A1 | 3/2007 | Escobosa et al. | |
| 2007/0073958 | A1 | 3/2007 | Kalayjian | |
| 2007/0077784 | A1 | 4/2007 | Kalayjian et al. | |
| 2007/0097275 | A1 | 5/2007 | Dresti et al. | |
| 2007/0136693 | A1 | 6/2007 | Lilleness et al. | |
| 2007/0156739 | A1 | 7/2007 | Black et al. | |
| 2007/0178830 | A1 | 8/2007 | Janik et al. | |
| 2007/0206949 | A1 | 9/2007 | Mortensen | |
| 2007/0225828 | A1 | 9/2007 | Huang et al. | |
| 2007/0233740 | A1 | 10/2007 | Nichols et al. | |
| 2007/0258595 | A1 | 11/2007 | Choy | |
| 2007/0271267 | A1 | 11/2007 | Lim et al. | |
| 2007/0279244 | A1 | 12/2007 | Haughawout et al. | |
| 2007/0296552 | A1 | 12/2007 | Huang et al. | |
| 2008/0005764 | A1 | 1/2008 | Arling et al. | |
| 2008/0016467 | A1 | 1/2008 | Chambers et al. | |
| 2008/0016468 | A1 | 1/2008 | Chambers et al. | |
| 2008/0042982 | A1 | 2/2008 | Gates et al. | |
| 2008/0062033 | A1 | 3/2008 | Harris et al. | |
| 2008/0062034 | A1 | 3/2008 | Harris et al. | |
| 2008/0068247 | A1 | 3/2008 | Harris et al. | |
| 2008/0198059 | A1 | 3/2008 | Harris et al. | |
| 2009/0224955 | A1 | 9/2009 | Bates et al. | |
| 2010/0033638 | A1 | 2/2010 | O'Donnell | |

FOREIGN PATENT DOCUMENTS

| | | | |
|---|---|---|---|
| AU | 200169851 | A1 | 1/2002 |
| CN | 1399444 | A | 2/2003 |
| CN | 1434422 | A | 8/2003 |
| DE | 19520754 | A1 | 12/1996 |
| EP | 103 438 | A1 | 3/1984 |
| EP | 398 550 | A2 | 11/1990 |
| EP | 0972280 | A1 | 1/2000 |
| EP | 1014577 | A1 | 6/2000 |
| EP | 1198069 | B1 | 4/2002 |
| EP | 1777830 | A1 | 4/2007 |
| FR | 2738931 | A1 | 3/1997 |
| GB | 2081948 | A | 2/1982 |
| GB | 2175724 | A | 12/1986 |
| GB | 2304217 | A | 3/1997 |
| JP | 7112301 | B | 11/1995 |
| JP | 2002058079 | A | 2/2002 |
| JP | 2002271871 | A | 9/2002 |
| JP | 2003087881 | A | 3/2003 |
| MX | PA/2003000322 | A | 11/2003 |
| WO | WO 01/69567 | A2 | 9/1991 |
| WO | 93/12612 | A1 | 6/1993 |
| WO | 93/19427 | A1 | 9/1993 |
| WO | 94/15417 | A1 | 7/1994 |
| WO | 95/01056 | A1 | 1/1995 |
| WO | 95/01057 | A1 | 1/1995 |
| WO | 95/01058 | A1 | 1/1995 |
| WO | 95/01059 | A1 | 1/1995 |
| WO | 95/32563 | A1 | 11/1995 |
| WO | 95/32583 | A1 | 11/1995 |
| WO | 96/30864 | A1 | 10/1996 |
| WO | 97/33434 | A1 | 9/1997 |
| WO | 98/043158 | A | 10/1998 |
| WO | 98/44477 | A1 | 10/1998 |
| WO | 99/04568 | A1 | 1/1999 |
| WO | WO 99/34564 | A1 | 7/1999 |
| WO | WO 00/34851 | A1 | 6/2000 |

| | | | |
|---|---|---|---|
| WO | 03/044684 | A1 | 5/2003 |
| WO | WO 03/045107 | A1 | 5/2003 |
| WO | WO 03/060804 | A1 | 7/2003 |
| WO | 03/100553 | A2 | 12/2003 |

OTHER PUBLICATIONS

Final Office Action for U.S. Appl. No. 10/839,970 mailed on Jun. 30, 2005; 11 pages.
Non-Final Office Action for U.S. Appl. No. 10/839,970 mailed on Dec. 20, 2005; 7 pages.
Non-Final Office Action for U.S. Appl. No. 10/839,970 mailed on Jan. 3, 2007; 9 pages.
Final Office Action for U.S. Appl. No. 10/839,970 mailed on Jun. 18, 2007; 10 pages.
Non-Final Office Action for U.S. Appl. No. 10/839,970 mailed on Mar. 14, 2008; 9 pages.
Final Office Action for U.S. Appl. No. 10/839,970 mailed on Oct. 1, 2008; 23 pages.
Notice of Allowance for U.S. Appl. No. 10/839,970 mailed on Jun. 12, 2009; 7 pages.
Non-Final Office Action for U.S. Appl. No. 11/199,922 mailed on Jul. 7, 2006; 13 pages.
Final Office Action for U.S. Appl. No. 11/199,922 mailed on Jan. 23, 2007; 7 pages.
Advisory Action for U.S. Appl. No. 11/199,922 mailed on Mar. 27, 2007; 3 pages.
Non-Final Office Action for U.S. Appl. No. 11/199,922 mailed on Jun. 5, 2007; 6 pages.
Final Office Action for U.S. Appl. No. 11/199,922 mailed on Feb. 11, 2008; 6 pages.
Notice of Allowance for U.S. Appl. No. 11/199,922 mailed on Jul. 3, 2008; 6 pages.
Final Office Action for U.S. Appl. No. 11/267,528 mailed on Jan. 15, 2010; 8 pages.
Non-Final Office Action for U.S. Appl. No. 11/267,528 mailed on Jun. 2, 2009; 9 pages.
Advisory Action for U.S. Appl. No. 11/267,528 mailed on Apr. 30, 2009; 3 pages.
Non-Final Office Action for U.S. Appl. No. 11/267,528 mailed on Jan. 25, 2008; 7 pages.
Final Office Action for U.S. Appl. No. 11/267,528 mailed on Oct. 28, 2008; 9 pages.
Non-Final Office Action for U.S. Appl. No. 11/841,778 mailed on Jun. 10, 2009; 17 page.
Anonymous, "Philips Pronto TS-1000 Remote". Product Review [online]. RemoteCentral.com, 2005 [retrieved on Sep. 26, 2005]. Retrieved from the Internet: <URL: www.remotecentral.com/pronto/index.html>.
Anonymous, "Philips Revolutionizes Home Theatre Control". Press Release [online]. RemoteCentral.com, 1998 [retrieved on Sep. 26, 2005]. Retrieved from the Internet: <URL: http://www.remotecentral.com/pronto/press.htm>.
Anonymous, "ProntoEdit User Manual" [online] Philips, 2002 [retrieved on Sep. 26, 2005]. Retrieved from the Internet: <URL: http://www.pronto.philips.com/index.cfm?id=241>.
Anonymous, "Quick File Area Index". Components from Different Manufacturers [online] RemoteCentral.com, 2005 [retrieved on Sep. 26, 2005]. Retrieved from the Internets: <URL: http://www.remotecentral.com/files/index.html>.
Ciarcia, S., "Build a Trainable Infrared Master Controller," *Byte*, vol. 12, No. 3 (Mar. 1987), pp. 113-123.
Ciarcia, S., *The Best of Ciarcia's Circuit Cellar*, NY, McGraw-Hill, Inc., 1987, pp. 345-354.
Konstan, J. A., "State problems in programming human-controlled devices," *Digest of Tech. Papers of Int. Conf. on Consumer Electronics* (*ICCE*), TUPM 8.5 (1994), pp. 122-123.
Radio Shack, "*Owner's Manual: Universal Remote Control*," (1987) pp. 1-17.
Radio Shack, "*Owner's Manual: Universal Remote Control*," (1987) pp. 1-30.

* cited by examiner

ONLINE REMOTE CONTROL CONFIGURATION SYSTEM

CROSS-REFERENCES TO RELATED APPLICATIONS

This application is a continuation of U.S. application Ser. No. 10/839,970, filed May 5, 2004; which is a continuation of U.S. application Ser. No. 09/804,623, filed Mar. 12, 2001; which claims the benefit of U.S. Provisional Application No. 60/189,487, filed Mar. 15, 2000. The disclosures of Ser. Nos. 10/839,970, 09/804,623 and 60/189,487 are herein incorporated herein by reference in their entirety.

FIELD OF THE INVENTION

The present invention relates generally to universal remote control devices and more specifically it relates to an online remote control configuration system for efficiently programming a remote control to control a plurality of external electronic devices.

DESCRIPTION OF THE PRIOR ART

Remote control devices have been in use for years. Remote control devices are utilized to operate various external electronic devices including but not limited to televisions, stereos, receivers, VCRs, DVD players, CD players, amplifiers, equalizers, tape players, cable units, lighting, window shades and other electronic devices. A conventional remote control is typically comprised of a housing structure, a keypad within the housing structure for entering commands by the user, electronic circuitry within the housing structure connected to the keypad, and a transmitter electrically connected to the electronic circuitry for transmitting a control signal to an electronic device to be operated.

The user depresses one or more buttons upon the keypad when a desired operation of a specific electronic device is desired. For example, if the user desires to turn the power off to a VCR, the user will depress the power button upon the remote control which transmits a "power off" control signal that is detected by the VCR resulting in the VCR turning off.

Because of the multiple electronic devices currently available within many homes and businesses today, a relatively new type of remote control is utilized to allow for the control of a plurality of electronic devices commonly referred to as a "universal remote control." Most universal remote controls have "selector buttons" that are associated with the specific electronic device to be controlled by the remote control (e.g. television, VCR, DVD player, etc.). Universal remote control devices allow for the control of a plurality of external electronic devices with a single remote control thereby eliminating the need to have a plurality of remote controls physically present within a room.

Conventional universal remote controls are typically programmed using two methods: (1) entering an "identifier code" directly into the remote control, or (2) sampling the control signal transmitted by another remote control device. Neither method of programming a universal remote control is efficient and causes many consumers to either not purchase a universal remote control or abandon the usage of an already purchased remote control.

Entering identifier codes into a remote control can be time consuming and difficult for many users. If the user loses the "code book" that comes with the universal remote control they are often times left with a useless universal remote control that they are unable to reprogram. Often times a consumer is given 4-8 different "possible" identifier codes for a particular brand of electronic device thereby requiring the user to, through trial and error, determine the correct identifier code. Sometimes an individual believes they have entered the proper identifier code since one or two of the commands on the keypad work only to find out later that one or more commands do not work with the electronic device since the proper identifier code was not entered.

Also, sampling of control signals is very time consuming and difficult to ensure proper sampling. An individual must expend significant amounts of time sampling infrared signals from another remote control and "saving" these signals within the universal remote control thereafter assigning the particular signal to a button on the keypad. This is very labor intensive and the results are only as stable as the infrared code sampled.

There are many problems with conventional universal remote controls. For example, many universal remote controls have a plurality of buttons wherein many are never utilized since the manufacturer attempts to have physical buttons for each possible command of each possible electronic device. Another problem conventional universal remote controls is that the electronic components within these devices is relatively complex and expensive to manufacture resulting in an increased cost to the consumer.

While these devices may be suitable for the particular purpose to which they address, they are not as suitable for efficiently programming a remote control to recognize a plurality of external electronic devices. Conventional universal remote control devices do not allow for easy and quick programming thereof. In addition, conventional universal remote controls are not always properly programmed thereby causing consumer dissatisfaction.

In these respects, the online remote control configuration system according to the present invention substantially departs from the conventional concepts and designs of the prior art, and in so doing provides an apparatus primarily developed for the purpose of efficiently programming a remote control to recognize a plurality of external electronic devices.

BRIEF SUMMARY OF THE INVENTION

In view of the foregoing disadvantages inherent in the known types of universal remote controls now present in the prior art, the present invention provides a new online remote control configuration system construction wherein the same can be utilized for efficiently programming a remote control to recognize a plurality of external electronic devices.

The general purpose of the present invention, which will be described subsequently in greater detail, is to provide a new online remote control configuration system that has many of the advantages of the universal remote control devices mentioned heretofore and many novel features that result in a new online remote control configuration system which is not anticipated, rendered obvious, suggested, or even implied by any of the prior art remote controls, either alone or in any combination thereof.

To attain this, the present invention generally comprises a remote control having a housing, a keypad, and an electronic system for receiving configuration data from a control station via a global computer network (e.g. Internet). The user preferably "samples" one or more signals from a remote control into the electronic system and then uploads the samples to the control station. The control station analyzes the uploaded samples and transmits the appropriate configuration data to properly configure the electronic system. The user may also access a web site of the control station and manually select each of the external electronic devices that the remote control is to operate after which the control station sends the appropriate configuration data to the electronic system.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an online remote control configuration system that will overcome the shortcomings of the prior art devices.

A second object is to provide an online remote control configuration system for efficiently programming a remote control to recognize a plurality of external electronic devices.

Another object is to provide an online remote control configuration system that allows for a simple electronic configuration.

An additional object is to provide an online remote control configuration system that does not require a universal remote control to store hundreds of different signal codes that are never utilized.

A further object is to provide an online remote control configuration system that allows an individual to quickly configure a universal remote control.

A further object is to provide an online remote control configuration system that is able to upload a relatively complex configuration (e.g. "watch television") than is currently possible with current universals.

A further object is to provide an online remote control configuration system that allows customization of a remote control but for the specific system in which they are interconnected (e.g. so that they are effectively a system).

A further object is to provide an online remote control configuration system that can be configured to how the user desires to utilize electronic devices.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
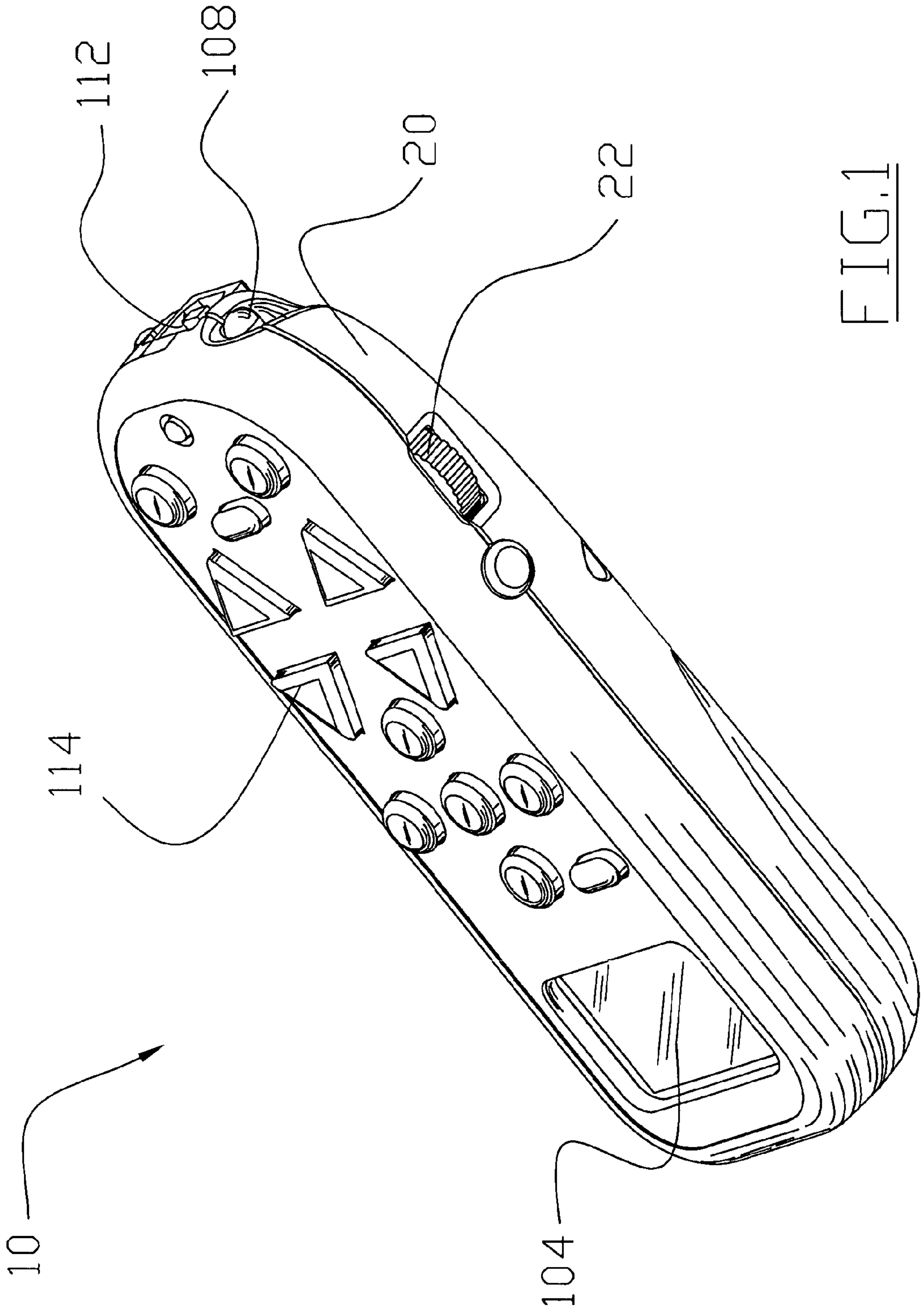
FIG. 1 is an upper perspective view of the present invention.
Figure 2:
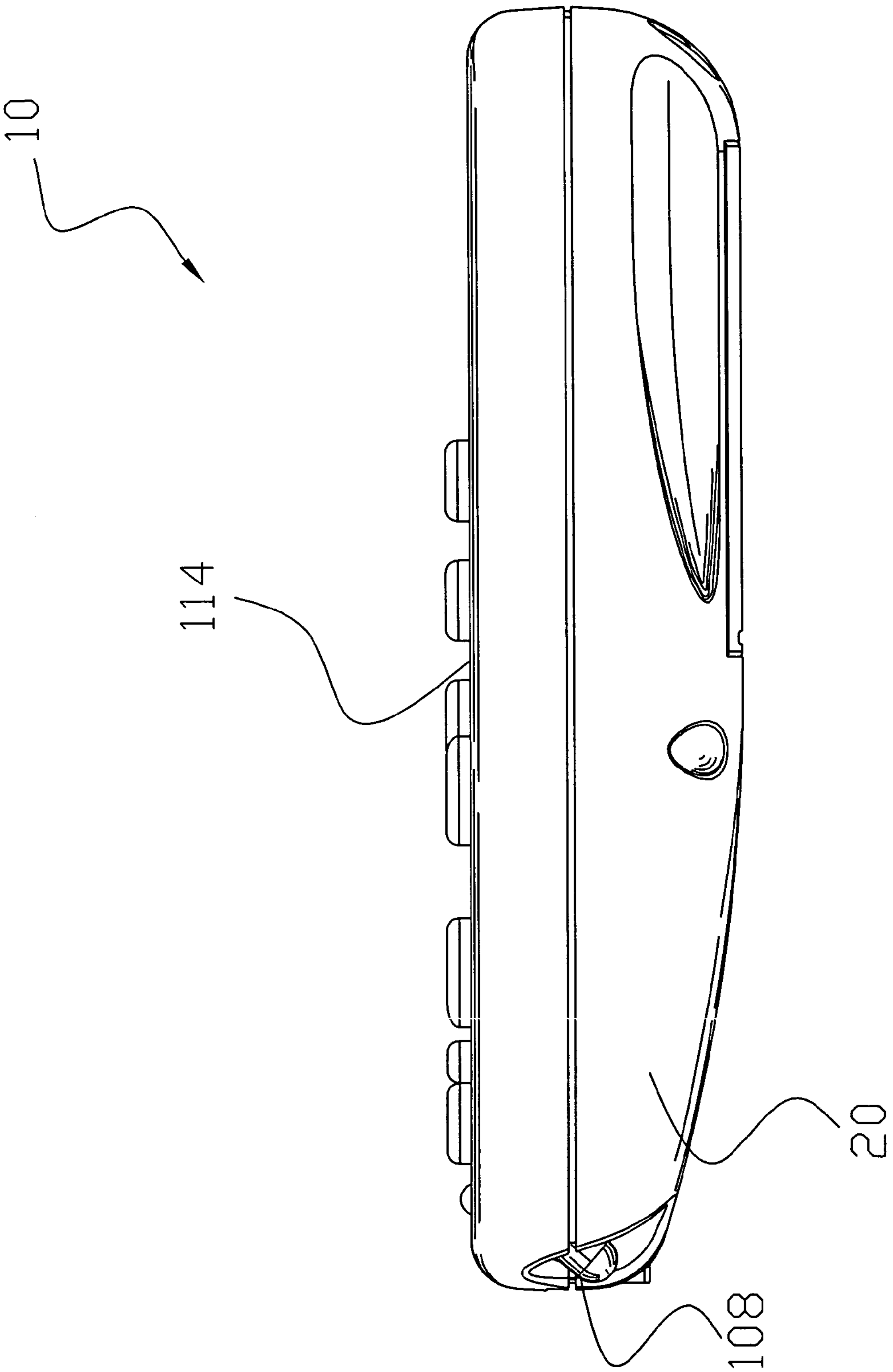
FIG. 2 is a side view of the present invention.
Figure 3:
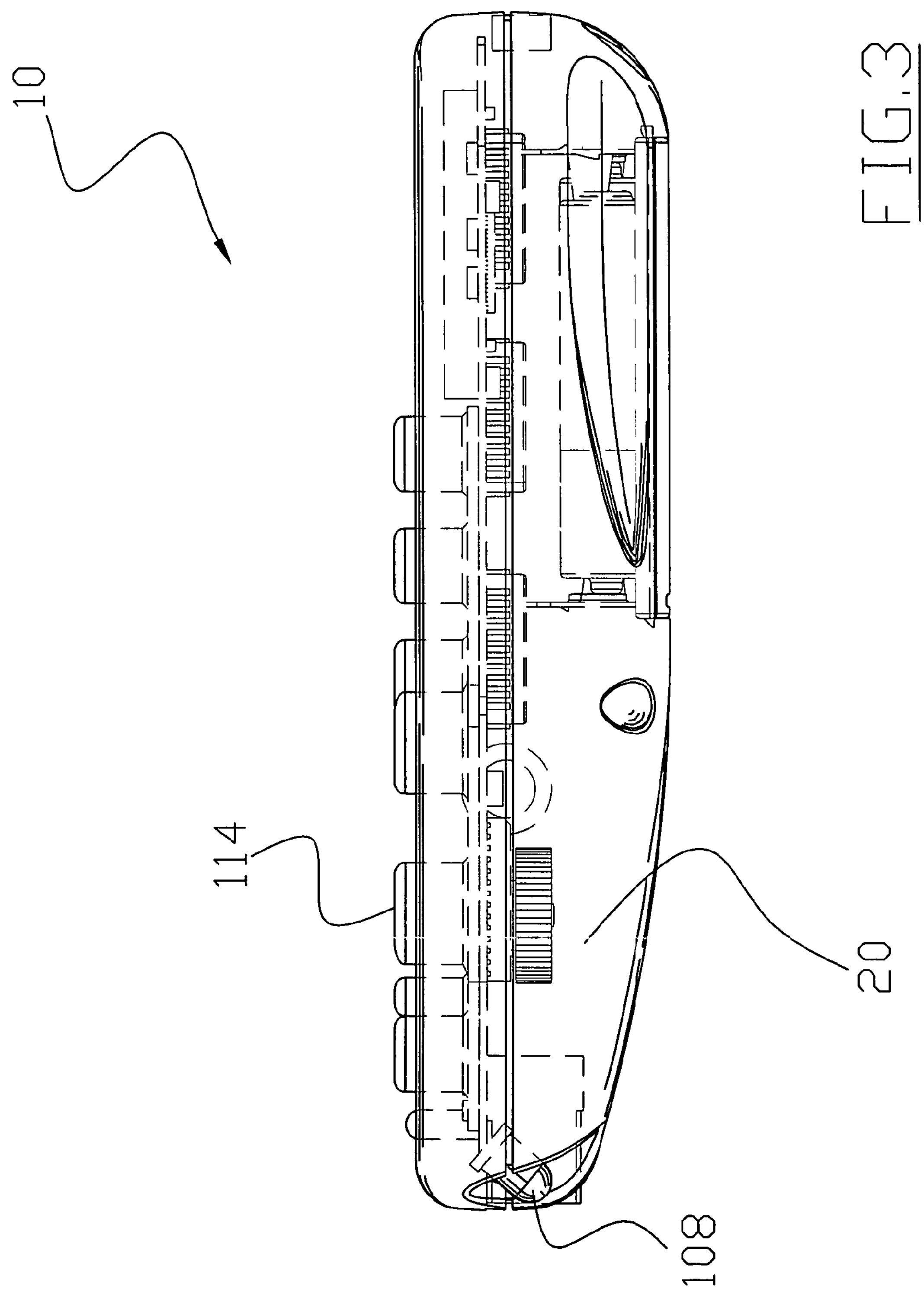
FIG. 3 is a side view of the present invention illustrating electronic circuitry within.
Figure 4:
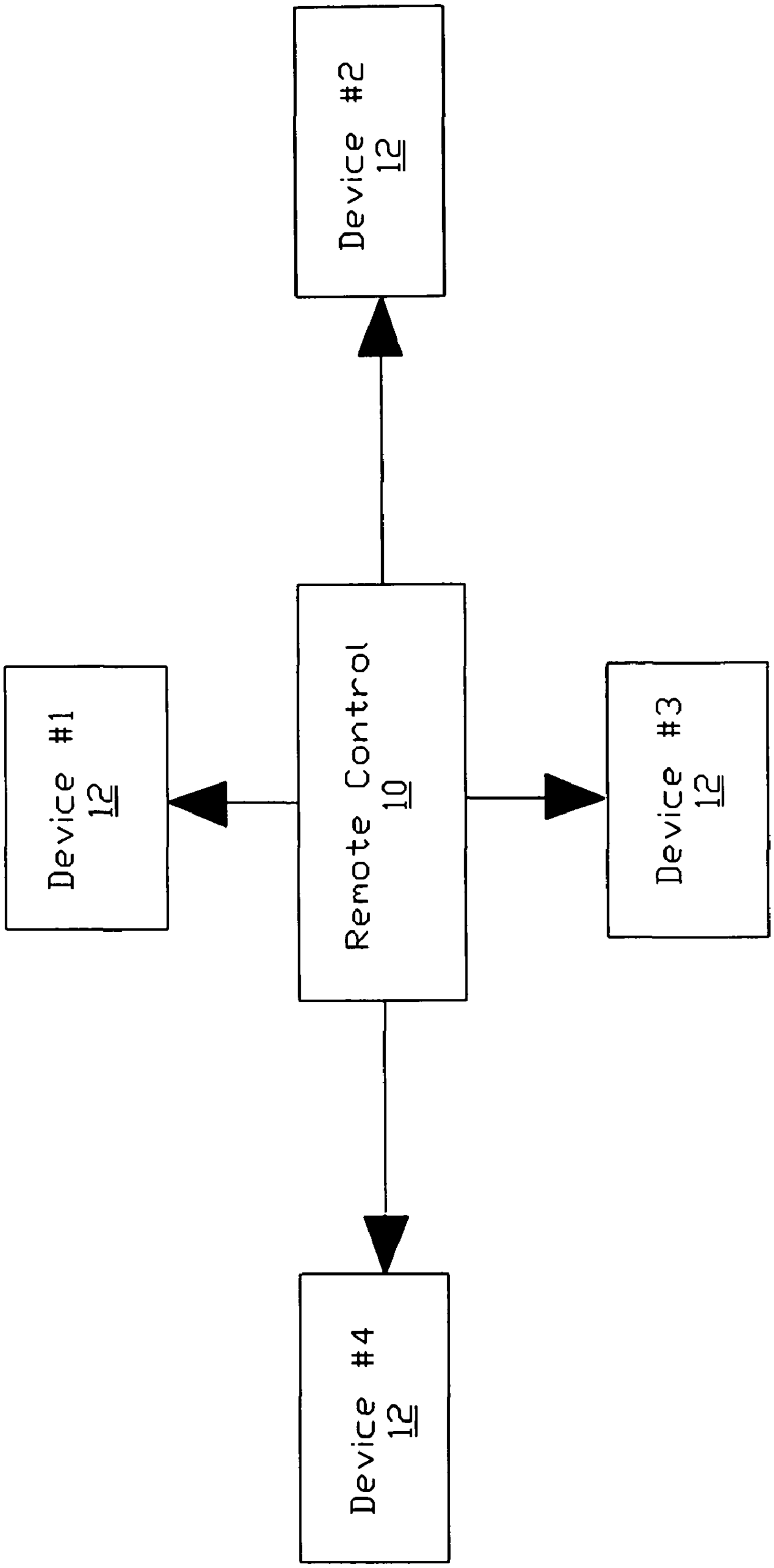
FIG. 4 is a block diagram illustrating the communications between the present invention and a plurality of external electronic devices.
Figure 5:
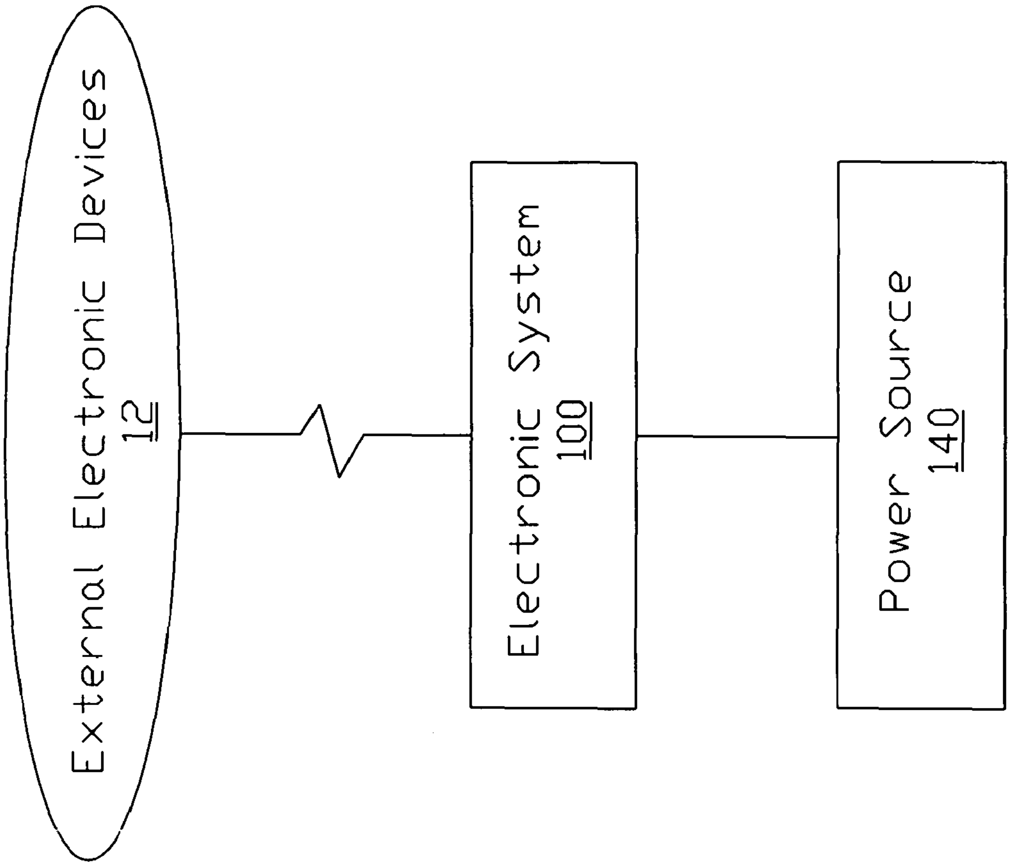
FIG. 5 is a block diagram illustrating the electronic system of the present invention electrically connected to the power source and in communication with the external electronic devices.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated).

For example, the transmission medium may include a communications network, such as but not limited to the Internet or wireless communications.

Turning now descriptively to the drawings, in which similar reference characters denote similar elements throughout the several views, FIGS. 1 through 16 illustrate an online remote control configuration system 10, which comprises a remote control having a housing, a keypad, and an electronic system for receiving configuration data from a control station via a global computer network (e.g. Internet). The user preferably "samples" one or more signals from a remote control into the electronic system and then uploads the samples to the control station. The control station analyzes the uploaded samples and transmits the appropriate configuration data to properly configure the electronic system. The user may also access a web site of the control station and manually select each of the external electronic devices that the remote control is to operate after which the control station sends the appropriate configuration data to the electronic system. The user can also specify how the devices are connected and the configuration can be transferred to the electronic system 100 from the control station 40.

A. Remote Control Structure

The present invention generally is comprised of a housing 20 having a structure and shape similar to conventional remote control devices. The housing 20 may be constructed of various types of materials and shapes as can be appreciated by one skilled in the art. The housing is preferably structured to be ergonomic for a majority of users.

The present invention may be utilized to control and operate various external electronic devices including but not limited to televisions, stereos, receivers, VCRs, DVD players, CD players, amplifiers, equalizers, tape players, cable units, satellite dish receivers, lighting, window shades and other electronic devices. Almost any number of external electronic devices may be controlled by the present invention as can be accomplished with conventional remote control devices.

Figure 6:
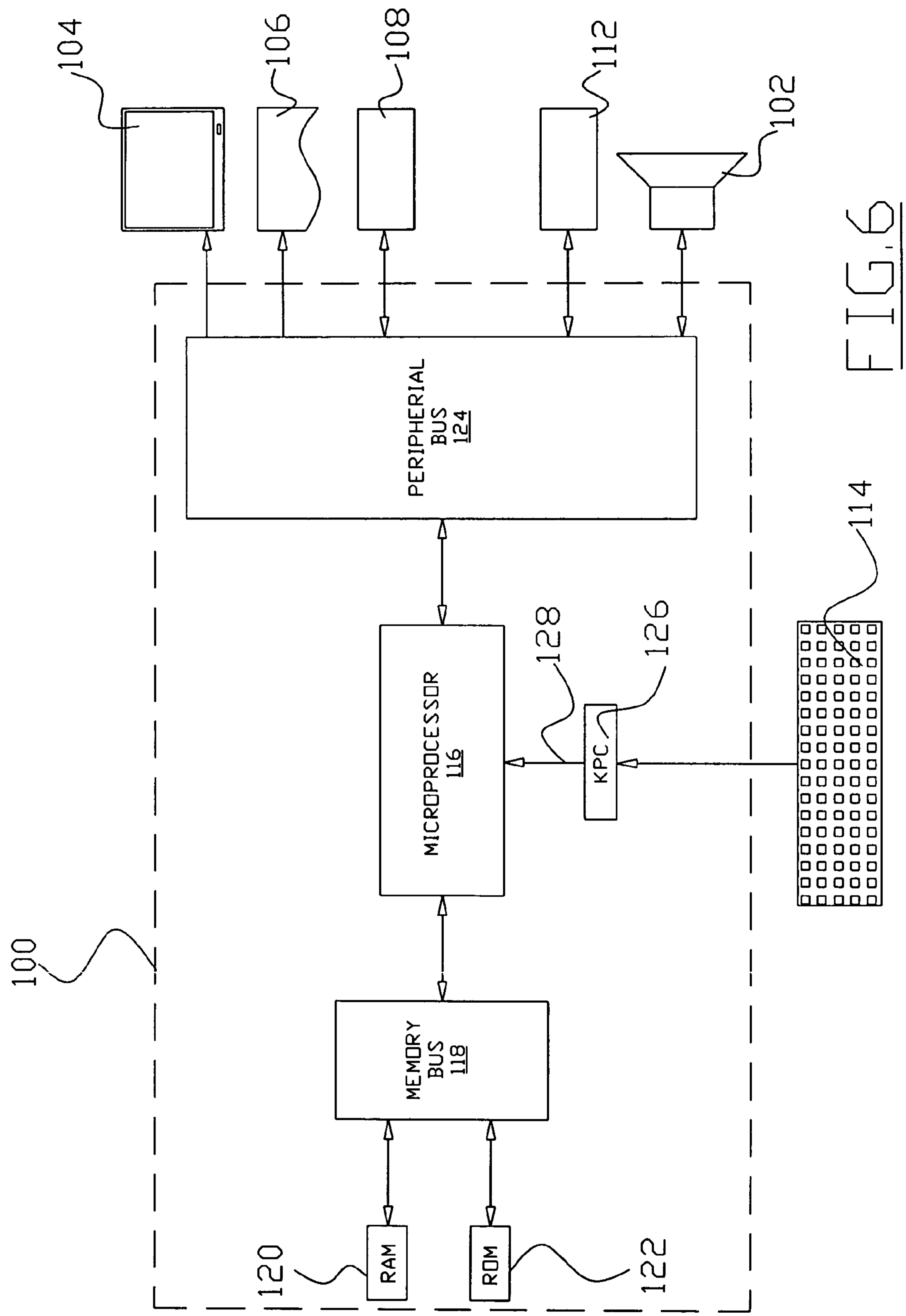
FIG. 6 is a block diagram illustrating the electronic system along with a plurality of accessory devices connected to thereof.

FIG. 6 is a block diagram of an exemplary electronic system 100 for practicing the various aspects of the present invention. The electronic system 100 is preferably enclosed within the housing. A portable power source 140 is electrically connected to the electronic system 100 for providing electrical power to the electronic system 100. The power source 140 may be comprised of any power source such as a battery structure (disposable or rechargeable), solar cells, or direct power.

The electronic system 100 preferably includes a display screen 104, a network interface 112, a keypad 114, a microprocessor 116, a memory bus 118, random access memory (RAM) 120, a speaker 102, read only memory (ROM) 122, a peripheral bus 124, a keypad controller 126, and a communications device 108. As can be appreciated, the electronic system 100 of the present invention may be comprised of any combination of well-known computer devices, personal digital assistants (PDAs), laptop computers, remote control devices and other electronic systems.

The microprocessor 116 is a general-purpose digital processor that controls the operation of the electronic system 100. Microprocessor 116 can be a single-chip processor or implemented with multiple components. Using instructions retrieved from memory, microprocessor 116 controls the reception and manipulations of input data and the output and display of data on output devices.

The memory bus 118 is utilized by microprocessor 116 to access RAM 120 and ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output and storage devices used by the electronic system 100. In the described embodiment(s), these devices include a display screen 104, an accessory device 106, a speaker 102, a communications device 108, and a network interface 112. A keypad controller 126 is used to receive input from the keypad 114 and send decoded symbols for each pressed key to microprocessor 116 over bus 128.

The display screen 104 is an output device that displays images of data provided by the microprocessor 116 via the peripheral bus 124 or provided by other components in the electronic system 100. Other output devices such as a printer, plotter, typesetter, etc. can be utilized as an accessory device 106.

The microprocessor 116 together with an operating system operate to execute computer code and produce and use data. The computer code and data may reside on RAM 120, ROM 122, or other storage mediums. The computer code and data could also reside on a removable program medium and loaded or installed onto the electronic system 100 when needed. Removable program mediums include, for example, PC-CARD, flash memory, and floppy disk.

Figure 7:
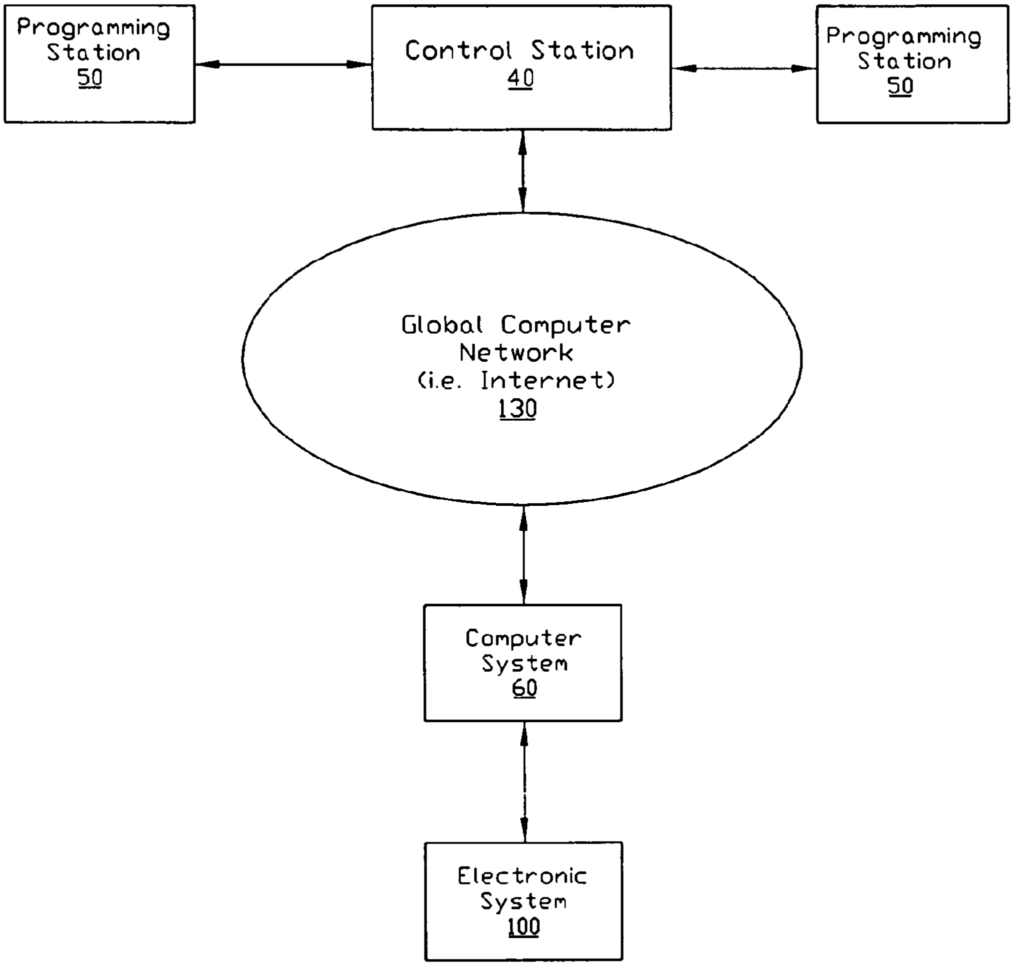
FIG. 7 is a block diagram of the present invention in communication with the control station via a global computer network wherein the electronic system is directly connected to an intermediary computer system.
Figure 8:
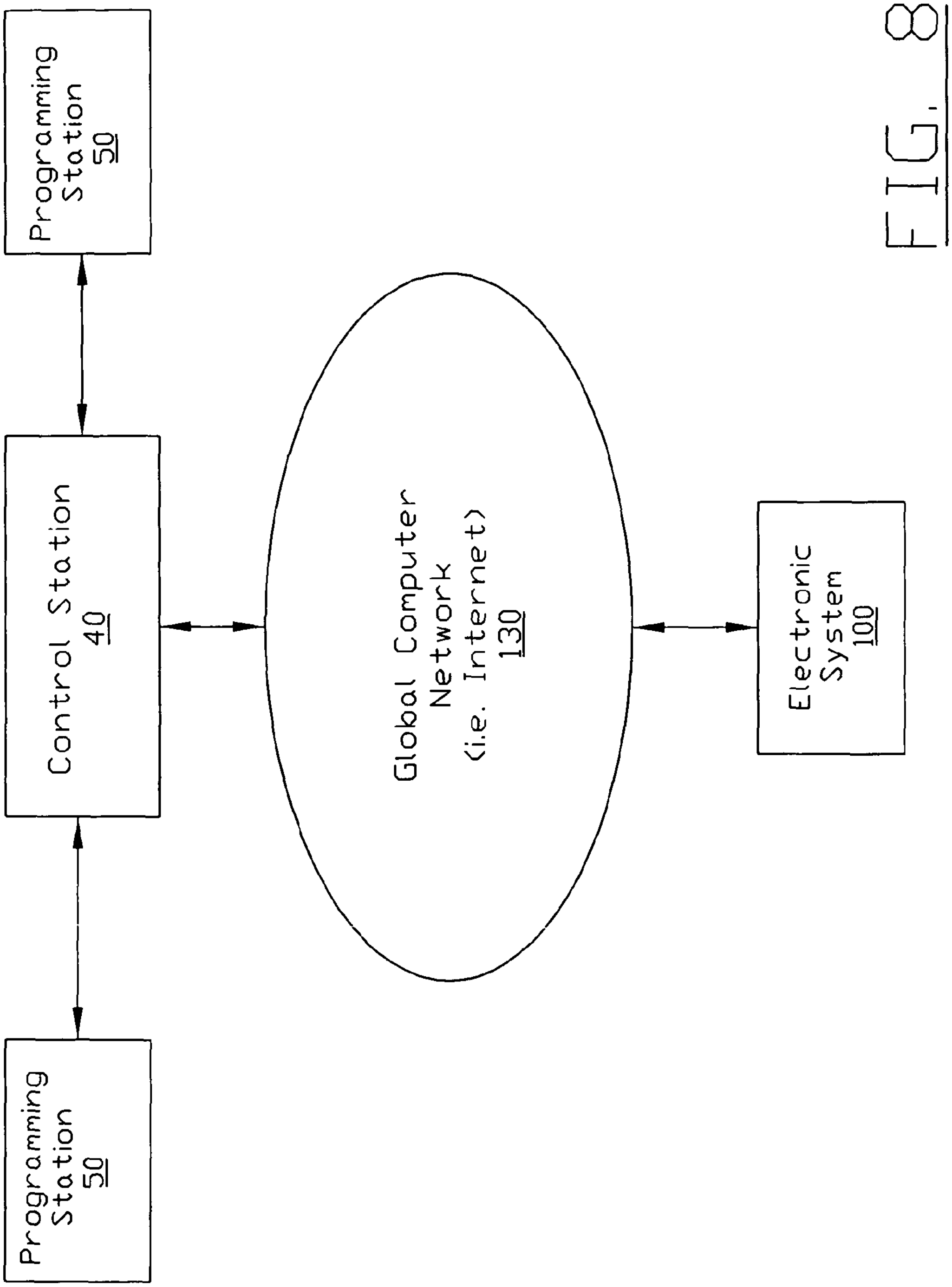
FIG. 8 is a block diagram of the present invention in communication with the control station directly via a global computer network without utilizing an intermediary computer system.

The network interface 112 is utilized to send and receive data over a network connected to other electronic systems. The network interface may also be comprised of a Universal Serial Bus (USB), an external bus standard that supports data transfer rates of 12 Mbps (12 million bits per second). A single USB port can be used to connect up to 127 peripheral devices, such as mice, modems, and keyboards. An interface card or similar device and appropriate software implemented by microprocessor 116 can be utilized to connect the electronic system 100 to an existing network and transfer data according to standard protocols including data over a global computer network such as the Internet. The electronic system 100 may connect to the Internet 130 via a computer system 60 or directly as illustrated in FIGS. 7 and 8 respectively.

The keypad 114 is used by a user to input commands and other instructions to the electronic system 100. Other types of user input devices can also be used in conjunction with the present invention. For example, pointing devices such as a computer mouse, a jog switch 22, a track ball, a stylus, or a tablet to manipulate a pointer on a screen of the electronic system 100.

The present invention can also be embodied as computer readable code on a computer readable medium. The computer readable medium is any data storage device that can store data which can be thereafter be read by a electronic system. Examples of the computer readable medium include read-only memory, random-access memory, magnetic data storage devices such as diskettes, and optical data storage devices such as CD-ROMs. The computer readable medium can also be distributed over a network coupled electronic systems so that the computer readable code is stored and executed in a distributed fashion.

The communications device 108 may be comprised of any well-known communication system that allows communications with external electronic devices. The communications device 108 may provide for various types of communication such as but not limited to via infrared (IR), wireless (e.g. BLUETOOTH), unidirectional, bi-directional, radio frequency (RF), visible light, ultrasonic and various other means for communicating with external electronic devices. The communications device 108 is capable of receiving a "signal sample" from another remote control wherein the signal sample is stored within the electronic system.

Input into the electronic system is accomplished mainly through the usage of the keypad 114. The keypad 114 includes a plurality of buttons that allow the user to execute one or more commands. The keypad 114 allows for the control of basic functions such as volume, channel manipulation, mute, and last channel. Various other input devices may be utilized to input data into the electronic system 100 such as a jog switch 22 (e.g. dial), motion and orientation detectors, touch sensitive screens and voice recognition. The display 104 provides information to the user such as possible tasks to complete or the current state of the external electronic devices.

B. Communication System

The present invention is best operated upon a global computer network such as the Internet 130. A plurality of computer systems around the world are in communication with one another via this global computer network.

The present invention preferably utilizes the Internet 130 for communications, however it can be appreciated that as future technologies are created that various aspects of the invention may be practiced with these improved technologies. In addition, wireless technologies provide a suitable communications medium for operating the present invention.

C. Web Page

The present invention is preferably utilized in conjunction with information presented upon a web page or other displayable medium representing the control station 40. A web page is typically comprised of a web page code that is stored upon a computer server. A typical web page includes textual, graphical and audio data within for display upon a computer system 60 and may be comprised of various formats.

The web page code may be formatted such as but not limited to HTML (Hyper-Text Markup Language), XML (Extensible Markup Language), HDML (Handheld Device Markup Language), and WML (Wireless Markup Language) that is displayable upon a computer system. Scripts such as JavaScript may be included within the web page code to request the server computer to request a specific audio file to be played with respect to an advertisement. As can be appreciated, additional formats for the web page code may be utilized as developed.

The web page code is retrieved by a computer system 60 or electronic system 100 via the Internet, wireless network or other communications channel utilizing a conventional web browser such as but not limited to NETSCAPE or MICROSOFT INTERNET EXPLORER. An individual using the computer system 60 enters the URL (Uniform Resource Locator) identifying the web page to retrieve the web page code associated with the desired web page.

Figure 12:
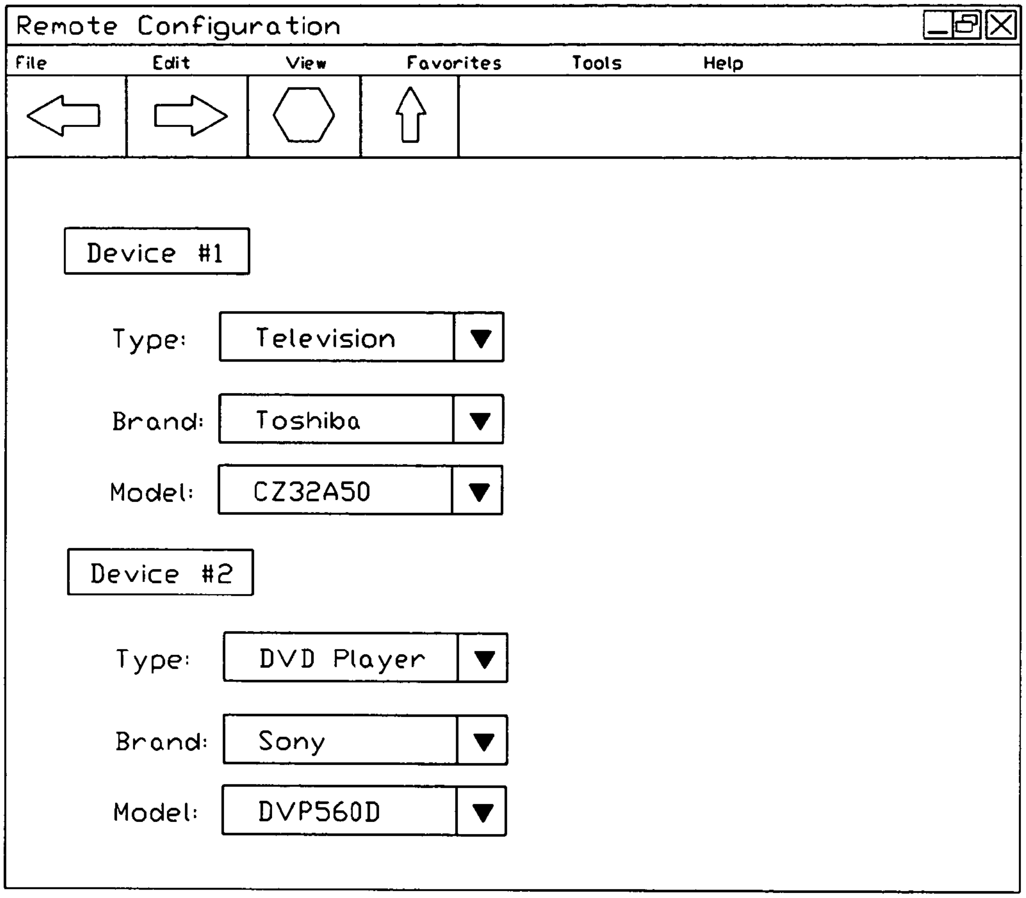
FIG. 12 is an illustration of a web page for entering electronic device information into.
Figure 13:
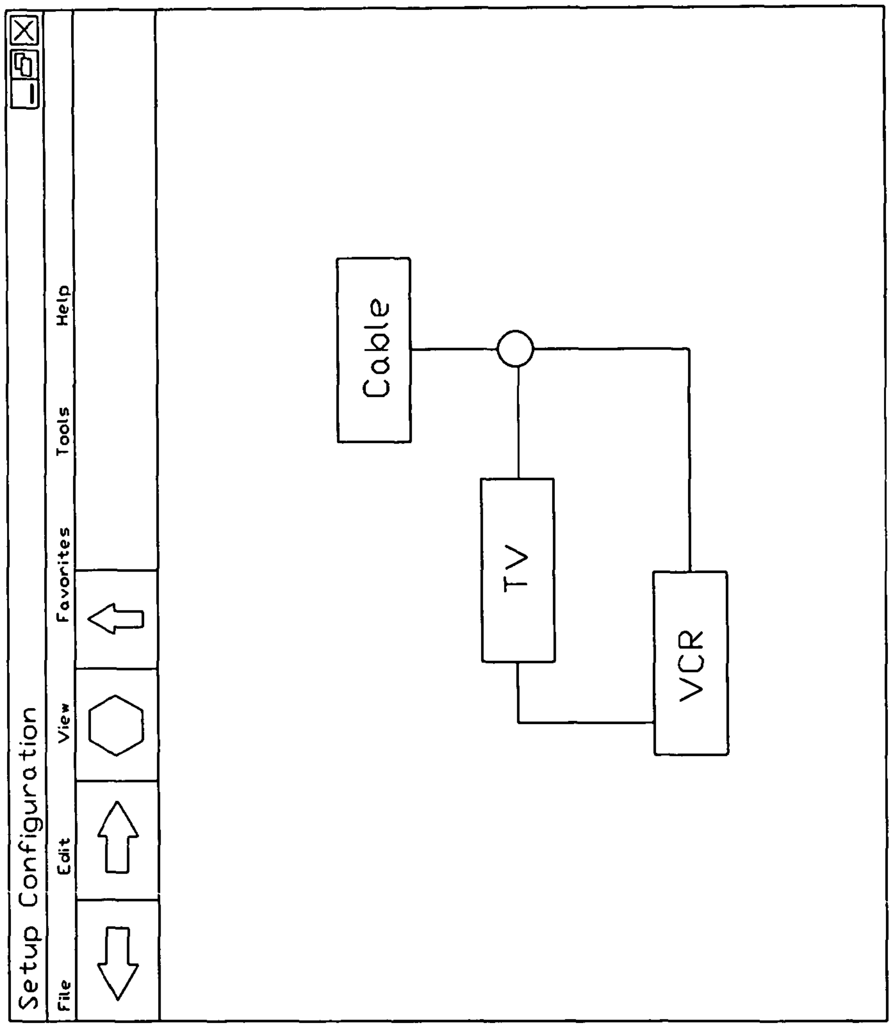
FIG. 13 is an illustration of a web page displaying the connection of external electronic devices.
Figure 14:
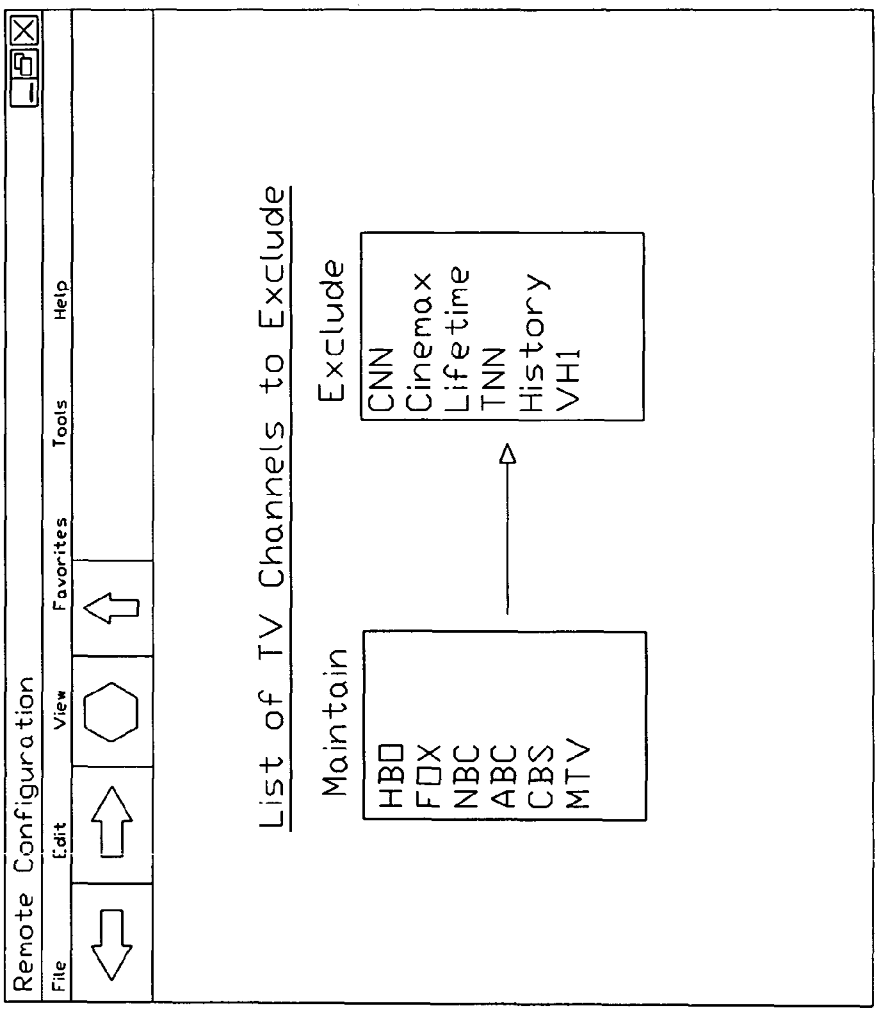
FIG. 14 is an illustration of a web page displaying the selection of channels to include and exclude from the electronic system configuration.
Figure 15:
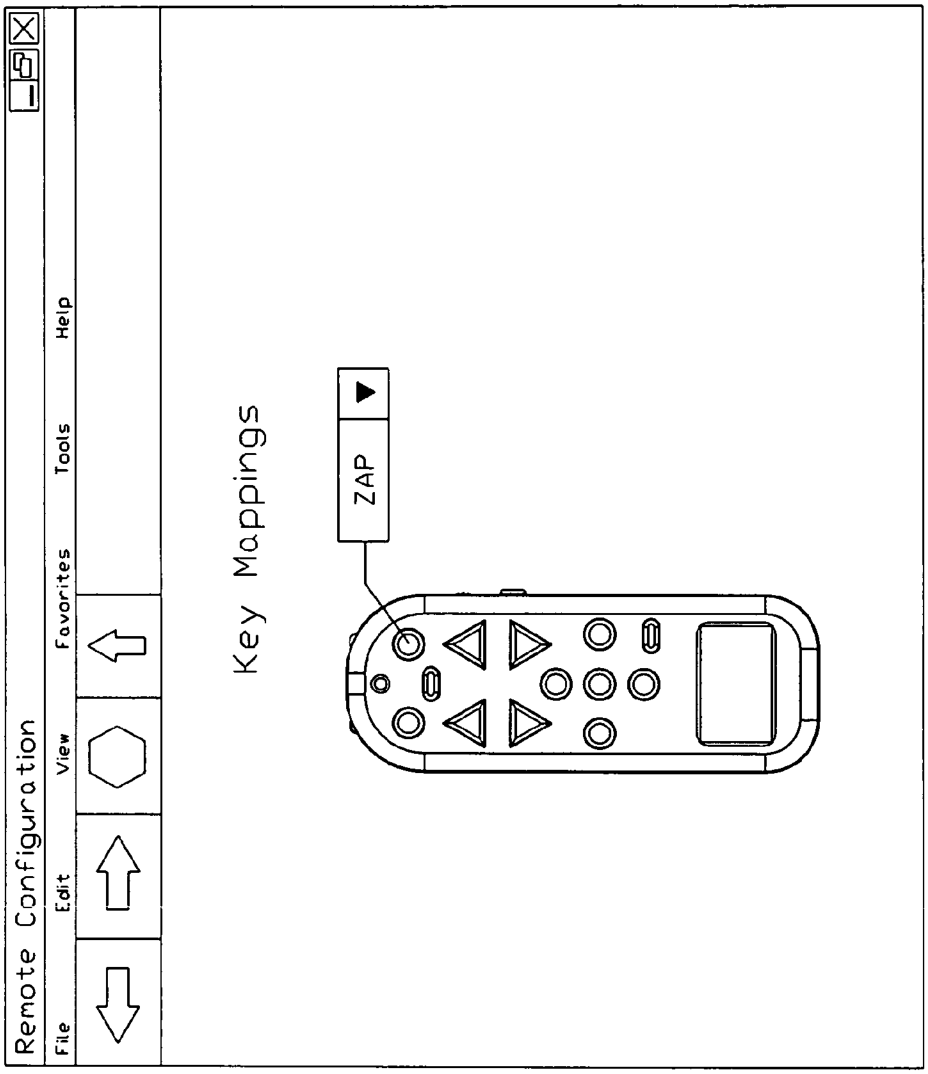
FIG. 15 is an illustration of a web page showing the key mappings upon the keypad as configured.
Figure 16:
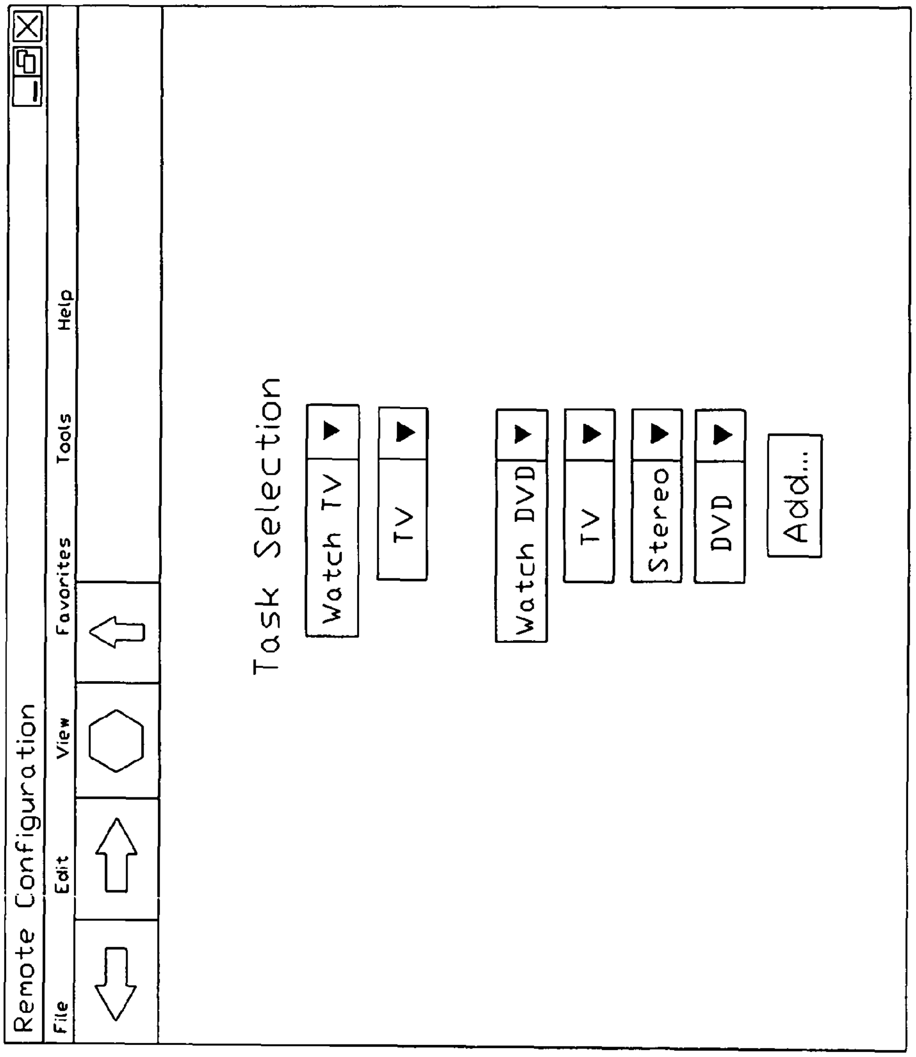
FIG. 16 is an illustration of a web page showing the setup of various tasks such as "Watch Television" and "Watch DVD."

As shown in FIG. 12 of the drawings, at least one of the web pages associated with the control station 40 allows for the direct entry of the device identification. More particularly, information relating to the type, brand and model of the device are preferably entered into the web page that are thereafter forwarded to the control station 40 for determination of the configuration data. Various other designs of web pages may be utilized to receive the device data as can be appreciated by one skilled in the art. FIG. 13 discloses a direct entry of the device connections. The device connections can be specified/represented graphically, through dropdown lists or other configurations.

D. Control Station

The control station 40 is in communication with the Internet 130 via various well-known means. The control station 40 is preferably accessed by users via a web page which allows the users to identify themselves and modify user settings. The user may input various conditions and requirements regarding the external electronic devices 12 that the remote control is to control. The user settings may be modified at anytime via the web page or other means.

The control station 40 is in communication with one or more programming stations 50 that provide updated electronic device information to the control station 40. The electronic device information is basically comprised of product information, type, brand, model, year, communication type, and signal configuration data. It can be appreciated that additional types of electronic device information may be received and stored by the control station 40.

The control station 40 maintains a database that allows for the determination of an electronic device by one or more signal samples from the corresponding remote control. The control station maintains a database that allows for the determination of what inputs and outputs are on the electronic devices 12, and the mechanism for transferring between states. The control station 40 is preferably updated at periodic intervals regarding updated information regarding new electronic devices on the market.

The remote control is a very flexible device that me be used to provide many types of information to the user. The process of control station 40 updating the remote control with the most recent information is sometimes referred to herein as "synchronizing." During the synchronization process (which may be controlled by control station 40) data and codes stored on the remote control may be altered to allow the device to provide updated information to the user.

Data and codes that may be synchronized with the remote control may include data and codes for a current television schedule. According to one embodiment, synchronization of the remote control with the control station may occur on a regular basis (e.g., daily, hourly, etc.) or on irregular basis. The provided information may then degrade over time. For example, if the remote control is synchronized on a Monday, the remote control may be updated to include detailed programming information (e.g., a television schedule) for all shows (e.g., television shows) for the coming week. For the week that follows, however, the detailed programming information might only include information for recurring shows. For example, if the user users the remote control for controlling a television for viewing a television show "A", but the remote control has not been synchronized in the last two months, the remote control may contain general information for television show "A" playing on Sunday at 6 pm on a given channel, say channel 2. However, the information for show "A" playing Sunday at 6 pm on channels 2, will not include information that is specific for the particular episode of show "A," such as the title for the specific episode of the show.

E. Sampling Mode

The preferred method of operating the present invention is to "sample" the signal emitted from a remote control corresponding to the electronic device 12 to be controlled. Prior to sampling the signal, the user may select a "sample button" which will place the electronic system in "sample mode" for receiving one or more sample signals per remote control. Signal sampling has been performed within the remote control industry for years and is well known to those skilled in the art particularly with infrared signal sampling. No further discussion of signal sampling is required as the same is readily apparent in the art.

Prior to sampling the signal, the user positions the communication device 108 of the electronic system 100 in a location to detect and receive the signal from the remote control. Though not required, the user typically will select a button on the keypad 114 identifying the button they plan to press on the remote control prior to depressing. For example, if the user is going to sample the "power on/off signal" from the remote control, the user would select the "power button" or other appropriate button on the keypad 114 during sampling mode.

Figure 9:
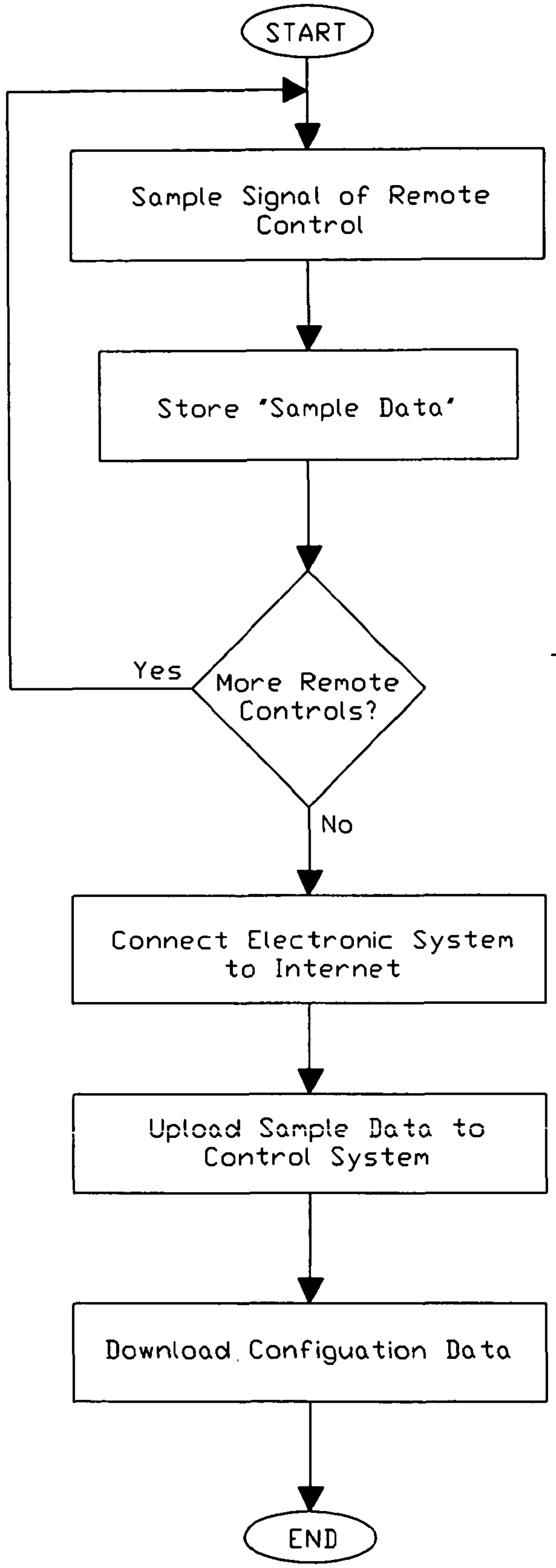
FIG. 9 is a flowchart illustrating the overall operation of the present invention from sampling the signal code of each remote control to downloading the configuration data.

After identifying to the electronic system 100 what button on the remote control will be depressed, the user then depresses the desired button on the remote control thereby transmitting the signal to the communication device 108 which receives the signal as shown in FIG. 9 of the drawings. The signal is then converted and forwarded by the communication device 108 to the memory 120 of the electronic system 100 for storage. It can be appreciated that if the electronic system 100 is connected to the global computer network 130 that the sample signals do not need to be stored within the electronic system 100. Additional samples may be taken from the remote control or another remote control may be sampled.

F. Uploading Sampled Signals

Figure 10:
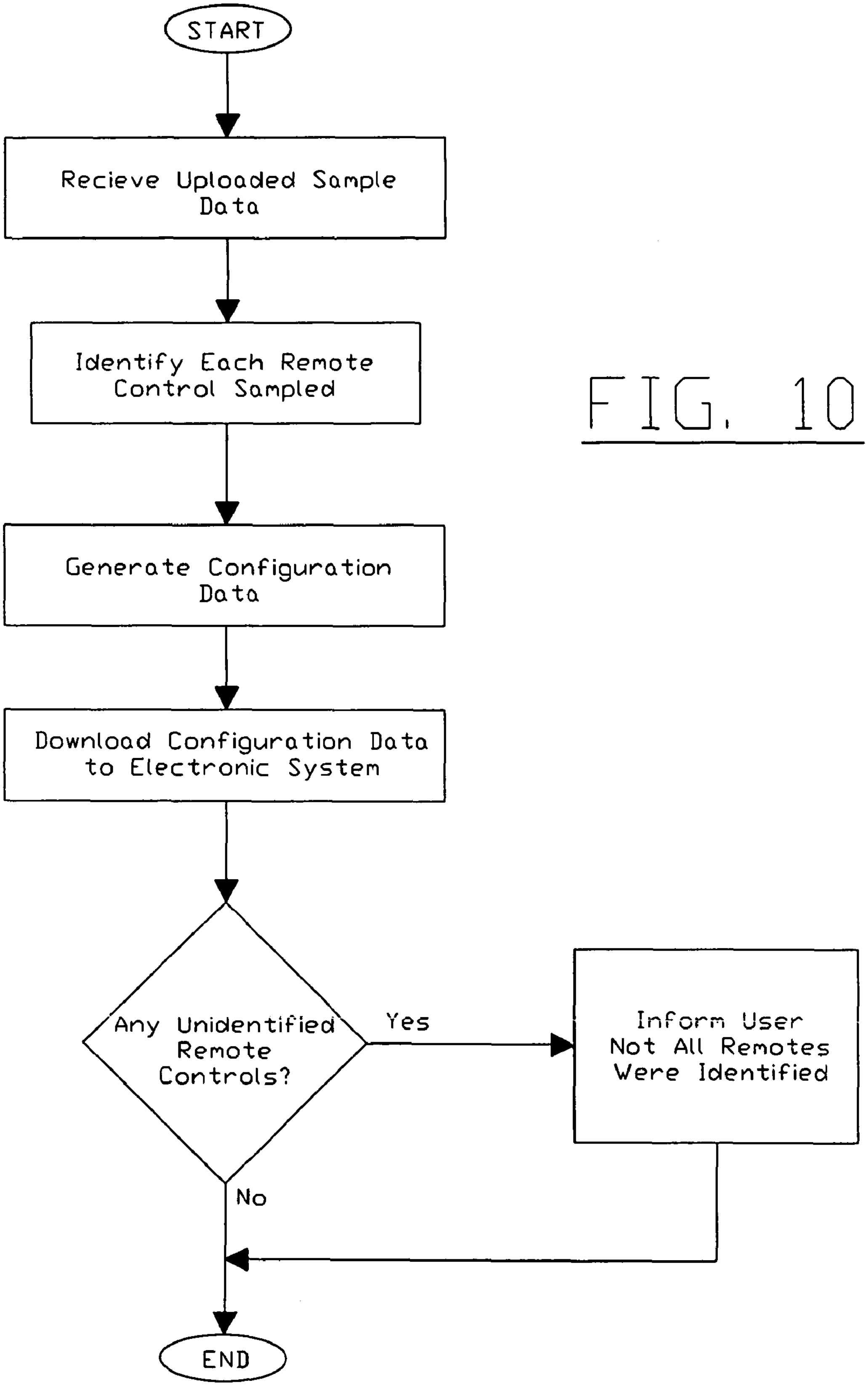
FIG. 10 is a flowchart illustrating the functionality within the control station for identifying each electronic device.

As shown in FIGS. 9 and 10 of the drawings, after the desired signals have been sampled the user connects the electronic system 100 to the Internet via the network interface 112, the communication device 108 or other means. The electronic system 100 may be directly or indirectly connected to the Internet as shown in the figures. The user then uploads the "sample data" to the control station 40.

As shown in FIG. 10 of the drawings, the control station 40 analyzes the sample data to determine the type, brand and model of each of the electronic devices 12 that are controlled by the corresponding sampled signal. Once the control station 40 has determined what the type, brand and model of each of the electronic devices 12 is, the control station 40 then generates "configuration data" that is then downloaded to the electronic system 100. The configuration data configures the electronic system so that it is able to control all of the external electronic devices 12 as a universal remote control would. The user then utilizes the programmed remote control similar to a universal remote control. It is noted that the control system may prompt the user for additional information that may be utilized to create a personalized configuration.

G. Direct Configuration

Figure 11:
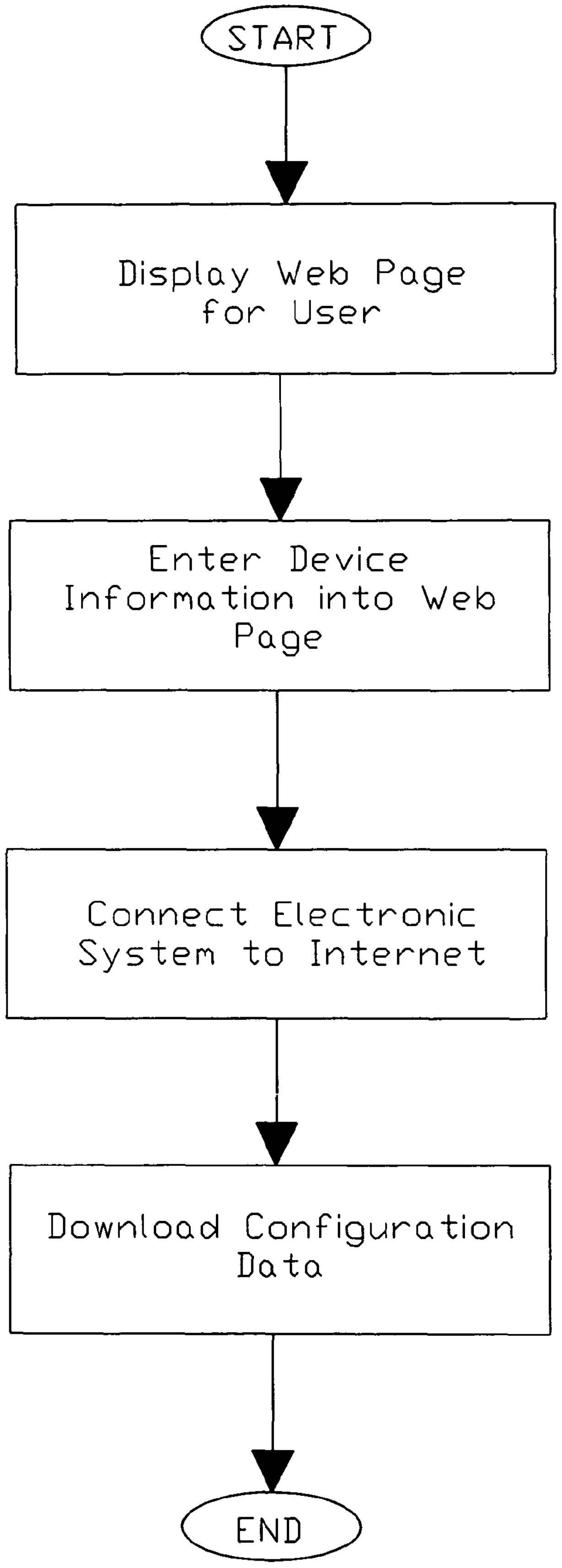
FIG. 11 is a flowchart illustrating the usage of a web page to allow a user to directly enter the identity of each electronic device into the control station.

As shown in FIGS. 11 and 12 of the drawings, the user may avoid sampling the signal from each of the remote controls and instead directly enter product information into the web page of the control station 40. The user preferably enters relevant product information such as but not limited to device type (e.g. VCR, television, DVD player, etc.), brand (e.g. SONY, TOSHIBA, etc.), and model.

Once the all of the device information has been entered for each of the electronic devices 12, the user then connects the electronic system 100 to the Internet via the network interface 112, the communication device 108 or other means. The electronic system 100 may be directly or indirectly connected to the Internet as shown in the figures.

Once the control station 40 has determined what the type, brand and model of each of the electronic devices 12 is, the control station 40 then generates "configuration data" that is then downloaded to the electronic system 100. The configuration data configures the electronic system so that it is able to control all of the external electronic devices 12 as a universal remote control would. The user then utilizes the programmed remote control similar to a universal remote control.

As electronic devices are added to or removed from the user's electronic system, they can update their device information at the control station 40 via the usage of an uploaded signal sample or directly through the web page. The user is able to utilize the remote control as a conventional remote for all of their electronic devices 12 without interruption.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of those skilled in the art, it is not desired to limit the invention to the exact construction and operation shown and described, and accordingly, all suitable modifications and equivalents may be resorted to, falling within the scope of the invention.

What is claimed is:

1. A remote control configured to control a media appliance and to be communicatively coupled to a remote server via a network and the remote server is configured to provide information to the remote control via the network, the remote control comprising:

- a transmitter configured to send commands to the media appliance for playing a piece of media;
- a memory configured to store programming information provided by the remote server for the piece of media; and
- a controller configured to synchronize programming information with the remote server to obtain current programming information on an irregular basis from the remote server for the piece of media, wherein:

- subsequent to synchronization, the controller is configured to degrade the current programming information,
- the degraded current programming information includes information for another piece of media related to the piece of media, and
- the information for the other piece of media includes less information than the information in the current programming guide for the piece of media.

2. The remote control of claim 1, wherein the programming information provided by the remote server relates to the media appliance.

3. The remote control of claim 1, wherein the current programming information includes programming information for shows.

4. The remote control of claim 3, wherein the current programming information is current for a period of time prior to which the piece of media is scheduled to play.

5. The remote control of claim 4, wherein shows are television shows, and the current programming information includes a schedule for the television shows.

6. The remote control of claim 1, wherein the current programming information includes product recommendations.

7. The remote control of claim 1, wherein the network is the Internet.

8. The remote control of claim 1, further comprising another transceiver configured to communicate with the remote server over the network to obtain the current programming information.

9. The remote control of claim 8, wherein the other transceiver is configured to communicate directly with the remote server over the network.

10. The remote control of claim 1, wherein the other transceiver is configured to communicate with the remote server via a host which is coupled to the network.

11. A remote control configured to control a media appliance and communicatively coupled to a remote server, which is configured to provide current information to the remote control, wherein the remote control is configured to communicate with the remote server via a network, the remote control comprising:

a transmitter configured to transmit a set of commands to the media appliance for playing a piece of media on the media appliance;

a memory configured to store the current information provided by the remote server, wherein the information relates to the piece of media; and a controller configured to synchronize with the remote server to obtain the current information on a periodic basis for the piece of media wherein:

subsequent to synchronization, the controller is configured to degrade the current information by at least selectively updating the current information such that:

the degraded current information includes information for another piece of media related to the first mentioned piece of media, and the information for the other piece of media includes less information than the information in the current information for the first piece of media.

12. The remote control of claim 11, wherein the current information provided by the remote server relates to the media appliance.

13. The remote control of claim 11, wherein the current information includes programming information for shows.

14. The remote control of claim 13, wherein the programming information is current for a period of time prior to which the piece of media is scheduled to play.

15. The remote control of claim 11, wherein the current information includes product recommendations.

16. The remote control of claim 11, wherein the network is the Internet.

17. The remote control of claim 11, further comprising another transceiver configured to communicate with the remote server over the network to obtain the current information.

18. The remote control of claim 17, wherein the other transceiver is configured to communicate directly with the remote server over the network.

19. The remote control of claim 11, wherein the other transceiver is configured to communicate with the remote server via a host which is coupled to the network.

20. A remote control configured to control a media appliance and be communicatively coupled to a remote server via a network, wherein the remote server is configured to provide information to the remote control via the network, the remote control device comprises:

a transmitter configured to send a set of commands to the media appliance to tune the media appliance to a channel;

a memory configured to store the information provided by the remote server, wherein the information relates to the channel and to media available on the channel; and a controller configured to synchronize with the remote server to obtain current information for the channel, wherein:

subsequent to synchronization, the controller is configured to degrade the current information, the degraded current information includes information for additional media available on the channel, the additional media are for recurring programs and the media are for programs related to the recurring programs, and the information for the channel and the additional media subsequent to synchronization is less than the current information for the channel and the media at a time of the synchronization.

21. A remote control system configured to control a media appliance and communicatively coupled to a remote server that is configured to provide current information to the remote control, wherein the remote control system is configured to communicate with the remote server via a network, the remote control system comprising:

a transmitter configured to transmit a set of commands to the media appliance for playing a piece of media using the media appliance;

a memory configured to store the current information provided by the remote server, wherein the information relates to the piece of media; and a controller configured to obtain from the remote server the current information on a recurrent basis for the piece of media wherein:

subsequent to synchronization, the controller is configured to degrade the current information by at least selectively updating the current information such that:

the degraded current information includes information for another piece of media related to the first mentioned piece of media, and the information for the other piece of media includes less information than the information in the current information for the first piece of media.

22. The remote control system of claim 21, wherein the transmitter, the memory, and the controller are components of a remote control device of the remote control system.

23. The remote control system of claim 21, wherein the current information includes programming information for shows.

24. The remote control system of claim 23, wherein the programming information is current for a period of time prior to which the piece of media is scheduled to play.

25. The remote control system of claim 21, further comprising a housing in which the transmitter, the memory, and the controller are positioned.

* * * * *